US012086334B2

(12) United States Patent
Thibeault et al.

(10) Patent No.: US 12,086,334 B2
(45) Date of Patent: Sep. 10, 2024

(54) TOPSIDE CONTROL PANEL AND TOPSIDE CONTROL PANEL SYSTEM FOR A BATHING UNIT SYSTEM AND METHOD OF OPERATING SAME

(71) Applicant: GECKO ALLIANCE GROUP INC., Quebec (CA)

(72) Inventors: Kathryn Thibeault, Saint-Jean-de-l'Île-d'Orleans (CA); Charlaine Héroux, Quebec (CA); Guillaume Tremblay, Quebec (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 257 days.

(21) Appl. No.: 17/515,703

(22) Filed: Nov. 1, 2021

(65) Prior Publication Data
US 2023/0132521 A1    May 4, 2023

(51) Int. Cl.
*G06F 3/0362* (2013.01)
*A47K 3/00* (2006.01)
(Continued)

(52) U.S. Cl.
CPC ............ *G06F 3/0362* (2013.01); *A47K 3/001* (2013.01); *G05G 1/10* (2013.01); *G05G 5/05* (2013.01);
(Continued)

(58) Field of Classification Search
CPC ..... G06F 3/0362; G06F 3/0482; A47K 3/001; A47K 3/00; G05G 1/10; G05G 5/05;
(Continued)

(56) References Cited

U.S. PATENT DOCUMENTS

D333,574 S    3/1993  Ackeret
D342,233 S    12/1993 Berlin et al.
(Continued)

FOREIGN PATENT DOCUMENTS

CA    2985901       7/2020
CN    201702053     1/2011
(Continued)

OTHER PUBLICATIONS

European Search Report issued on Apr. 3, 2023 in connection with European Patent Application No. 22204545.2—9 pages.
(Continued)

*Primary Examiner* — Lori L Baker
(74) *Attorney, Agent, or Firm* — Sheridan Ross P.C.

(57) ABSTRACT

A topside control panel is described for controlling water features in a bathing unit system. The topside control panel comprises a housing having a generally circular housing portion including a display screen and a manually operable actuator positioned about a periphery of the housing portion. A circuit board assembly is positioned in the housing and includes one or more processors programmed for rendering a multi-layer menu driven interface on the display for controlling at least some water features of the bathing unit system, wherein at least one specific menu layer of the multi-layer menu driven interface presents options for controlling the one or more pumps. Navigation through the multi-layer menu driven interface is permitted by using signals triggered at least in part by a combination of displacements of the manually operable actuator to select specific user-selectable options to arrive at the specific menu layer presenting options for controlling the one or more pumps.

31 Claims, 18 Drawing Sheets

(51) Int. Cl.
*G05G 1/10* (2006.01)
*G05G 5/05* (2006.01)
*G06F 3/0482* (2013.01)

(52) U.S. Cl.
CPC ....... *G06F 3/0482* (2013.01); *G05G 2505/00* (2013.01)

(58) Field of Classification Search
CPC ...... G05G 2505/00; G05G 5/03; G05G 25/04; G05G 1/08
USPC .............................. 4/541.3, 541.1, 492, 904
See application file for complete search history.

(56) References Cited

U.S. PATENT DOCUMENTS

| | | |
|---|---|---|
| D353,363 S | 12/1994 | Toby |
| D367,878 S | 3/1996 | Lee et al. |
| D378,438 S | 3/1997 | Sliney |
| 5,709,156 A | 1/1998 | Gavaert et al. |
| D395,283 S | 6/1998 | Monaco et al. |
| D465,201 S | 11/2002 | Gershfeld |
| D467,230 S | 12/2002 | Byrne |
| D468,701 S | 1/2003 | Byrne |
| D472,213 S | 3/2003 | Byrne |
| D486,452 S | 2/2004 | Dinh |
| 6,879,863 B2* | 4/2005 | Mueller .................. H03K 17/97 116/306 |
| D504,889 S | 5/2005 | Bartley |
| D517,311 S | 3/2006 | Kim |
| D517,482 S | 3/2006 | Nipke |
| D549,451 S | 8/2007 | Sann |
| D550,210 S | 9/2007 | Polany et al. |
| D560,170 S | 1/2008 | Ni |
| D561,472 S | 2/2008 | Nakamura |
| D578,960 S | 10/2008 | Fisher et al. |
| 7,456,574 B2 | 11/2008 | Hong et al. |
| D584,711 S | 1/2009 | Kim |
| D584,738 S | 1/2009 | Kim |
| D586,787 S | 2/2009 | Rivard |
| D586,800 S | 2/2009 | Andre |
| D591,682 S | 5/2009 | Lin |
| D596,173 S | 7/2009 | Arfin |
| D597,067 S | 7/2009 | Oh |
| D600,690 S | 9/2009 | Miyaji |
| D601,127 S | 9/2009 | Rivard et al. |
| D602,488 S | 10/2009 | Jiang |
| D614,871 S | 5/2010 | Tang |
| D621,548 S | 8/2010 | Chen |
| D625,928 S | 10/2010 | Lee |
| D627,777 S | 11/2010 | Akana |
| D636,769 S | 4/2011 | Wood |
| D643,007 S | 8/2011 | Song |
| D647,303 S | 10/2011 | Mish |
| D650,784 S | 12/2011 | Feldstein |
| D652,390 S | 1/2012 | Boehm |
| D654,077 S | 2/2012 | Radin |
| 8,149,222 B2 | 4/2012 | Hsieh |
| D658,591 S | 5/2012 | Margolin et al. |
| 8,172,604 B2 | 5/2012 | Byrne |
| D667,396 S | 9/2012 | Koh |
| 8,273,825 B2 | 9/2012 | Lin et al. |
| D669,444 S | 10/2012 | Shin et al. |
| D675,612 S | 2/2013 | Andre |
| 8,369,082 B2 | 2/2013 | Madonna |
| D677,660 S | 3/2013 | Groene |
| D678,215 S | 3/2013 | Brantley |
| 8,424,568 B2* | 4/2013 | Lang ..................... E03C 1/055 137/605 |
| D684,872 S | 6/2013 | Bias |
| D684,936 S | 6/2013 | Brantley |
| 8,498,103 B2 | 7/2013 | Graneto, III |
| D690,661 S | 10/2013 | Wisniewski |
| D690,693 S | 10/2013 | Akana |
| D692,008 S | 10/2013 | Feldstein |
| D693,340 S | 11/2013 | Ohshima |
| D694,195 S | 11/2013 | Gammon |
| D695,702 S | 12/2013 | Kim |
| 8,690,590 B2 | 4/2014 | Byrne |
| D713,830 S | 9/2014 | Dhondt |
| 8,873,226 B1 | 10/2014 | Peters |
| D720,358 S | 12/2014 | Ginsterblum |
| D721,377 S | 1/2015 | Pelster |
| 8,951,054 B2 | 2/2015 | Byrne |
| D727,857 S | 4/2015 | Acera |
| D729,793 S | 5/2015 | Hickoc |
| 9,069,201 B2 | 6/2015 | Pipitone et al. |
| D734,179 S | 7/2015 | Golden |
| D734,610 S | 7/2015 | Christie |
| D738,204 S | 9/2015 | Akana et al. |
| D743,349 S | 11/2015 | Leeland |
| D744,433 S | 12/2015 | Baumgartner |
| D752,517 S | 3/2016 | Scott |
| D752,568 S | 3/2016 | Kang |
| D759,018 S | 6/2016 | Subramaniam |
| D759,642 S | 6/2016 | Chao |
| D769,231 S | 10/2016 | Kwak |
| D770,973 S | 11/2016 | Toth |
| D777,119 S | 1/2017 | Lin |
| D804,451 S | 12/2017 | Isabelle |
| 9,869,594 B2 | 1/2018 | Scalera |
| D842,818 S | 3/2019 | Laflamme et al. |
| 10,353,499 B2 | 7/2019 | Laflamme et al. |
| 11,131,086 B2* | 9/2021 | Frackelton ......... G05D 23/1393 |
| 11,267,003 B2* | 3/2022 | Vogel .................... B05B 1/3436 |
| 11,566,405 B2* | 1/2023 | Reeder ...................... E03D 9/04 |
| 11,753,805 B2* | 9/2023 | Song .................. G06F 3/04847 4/676 |
| 2004/0095332 A1 | 5/2004 | Blanchard |
| 2005/0123161 A1 | 6/2005 | Polany et al. |
| 2007/0274101 A1 | 11/2007 | Cho et al. |
| 2008/0012734 A1 | 1/2008 | Ciechanowski et al. |
| 2008/0024462 A1 | 1/2008 | Kim et al. |
| 2008/0259056 A1 | 10/2008 | Freier |
| 2008/0298082 A1 | 12/2008 | Churchwell |
| 2009/0106890 A1 | 4/2009 | Rosenau |
| 2010/0038223 A1 | 2/2010 | Laurent |
| 2010/0070059 A1 | 3/2010 | Laflamme et al. |
| 2010/0304934 A1 | 12/2010 | Woodson |
| 2011/0037851 A1 | 2/2011 | Kim et al. |
| 2012/0050988 A1 | 3/2012 | Rothkopf et al. |
| 2012/0068832 A1 | 3/2012 | Feldstein |
| 2012/0092812 A1 | 4/2012 | Lewis et al. |
| 2012/0162953 A1 | 6/2012 | Wojack et al. |
| 2013/0027892 A1 | 1/2013 | Lim |
| 2013/0161489 A1 | 6/2013 | Gardner |
| 2013/0271950 A1 | 10/2013 | Park |
| 2013/0279142 A1 | 10/2013 | Wang |
| 2014/0043256 A1 | 2/2014 | Wu et al. |
| 2014/0262481 A1 | 9/2014 | Khoury et al. |
| 2014/0300567 A1 | 10/2014 | Inata et al. |
| 2014/0327624 A1 | 11/2014 | Srinivas et al. |
| 2015/0021064 A1 | 1/2015 | Wang et al. |
| 2015/0055034 A1 | 2/2015 | Pipitone et al. |
| 2015/0062087 A1 | 3/2015 | Cho et al. |
| 2015/0196456 A1 | 7/2015 | Nicholson |
| 2015/0220116 A1 | 8/2015 | Kemppinen et al. |
| 2015/0315737 A1 | 11/2015 | Yang et al. |
| 2016/0324026 A1 | 11/2016 | Kang et al. |
| 2017/0017315 A1 | 1/2017 | Laflamme et al. |
| 2018/0018051 A1 | 1/2018 | Ogura |
| 2021/0132782 A1* | 5/2021 | Laflamme ........... G06F 3/04817 |
| 2022/0342437 A1* | 10/2022 | Xie ....................... G06F 3/0393 |

FOREIGN PATENT DOCUMENTS

| | | |
|---|---|---|
| DE | 102019203170 A1 | 9/2020 |
| WO | 2021143377 A1 | 7/2021 |

OTHER PUBLICATIONS

Office Action issued on Sep. 16, 2016 in connection with U.S. Appl. No. 14/798,906—16 pages.

(56) References Cited

OTHER PUBLICATIONS

Examiner's report issued on Nov. 28, 2016 in connection with Canadian Patent Application No. 2,897,248—4 pages.
Examiner's report issued on Dec. 30, 2016 in connection with U.S. Appl. No. 29/531,050—5 pages.
Final Office Action issued on Apr. 13, 2017 in connection with U.S. Appl. No. 14/798,906—22 pages.
Non-final Office Action issued on Apr. 18, 2017 in connection with U.S. Appl. No. 29/531,050—23 pages.
Office Action issued on May 10, 2017 in connection with U.S. Appl. No. 29/547,230—17 pages.
Examiner's Report issued on Jun. 14, 2017 in connection with Canadian Patent Application No. 2,897,248—6 pages.
Notice of Allowance issued on Jul. 24, 2017 in connection with Design U.S. Appl. No. 29/547,230—29 pages.
Final Office Action issued on Oct. 11. 2017 in connection with Design U.S. Appl. No. 29/531,050—20 pages.
Non-Final Office Action issued on Nov. 29, 2017 in connection with U.S. Appl. No. 14/798,906—26 pages.
Examiner's report issued on Mar. 21, 2018 in connection with Canadian Patent Application No. 2,897,248—5 pages.
Notice of Non-compliant Amendment issued on Apr. 13, 2018 in connection with U.S. Appl. No. 14/798,906—3 pages.
Examiner's report issued on Aug. 13, 2018 in connection with Canadian Patent Application No. 2,985,901—4 pages.
Non-final Office Action issued on Sep. 28, 2018 in connection with U.S. Appl. No. 15/924,550—55 pages.
Final Office Action issued on Sep. 28, 2018 in connection with U.S. Appl. No. 14/798,906—61 pages.
Notice of Allowance issued on Oct. 30, 2018 in connection with Design U.S. Appl. No. 29/594,361—42 pages.
Examiner's Report issued on Dec. 13, 2018 in connection with Canadian Patent Application No. 2,897,248—7 pages.
Non-Final Office Action issued on Apr. 2, 2019 in connection with U.S. Appl. No. 14/798,906—35 Pages.
Notice of Allowance issued May 1, 2019 in connection with U.S. Appl. No. 15/924,550—8 pages.
Examiner's Report issued on Jul. 15, 2019 in connection with Canadian Patent Application No. 2,985,901—4 pages.
Examiner's Report issued on Dec. 13, 2019 in connection with Canadian Patent Application No. 2,897,248—7 pages.
Top-side spa panels (document 1)—dated Jun. 22, 2015.
Top-side spa panels (document 2)—dated Jun. 22, 2015.
Top-side spa panels (document 3)—dated Jun. 22, 2015.
Media Player Docking Station for Bathing Unit or Watercraft. (Design—© Questel). Orbit.com. [online PDF] 8 pgs. Print Date Feb. 16, 2016 [retrieved on Jul. 13, 2017] https://sobjprd.questel.fr/export/QPTUJ214/pdf2/e5fdea9d-f1c7-4d0a-9b21-2081cb3d7daa-232954.pdf.

* cited by examiner

TOPSIDE CONTROL PANEL AND TOPSIDE CONTROL PANEL SYSTEM FOR A BATHING UNIT SYSTEM AND METHOD OF OPERATING SAME

TECHNICAL FIELD

The present disclosure relates generally to the field of components for bathing unit systems, and more specifically, to a topside control panel and topside control panel system for controlling operational settings in a bathing unit system.

BACKGROUND

Bathing units, such as spas, typically include various bathing unit components that are used in operating the bathing unit system. The bathing unit components generally include pumps that circulate water through a piping system, pumps for activating water jets, a heating module to heat the water, a filter system, an air blower, an ozone generator, a lighting system, and a controller that activates and manages the various operational settings of the bathing unit components. Other types of bathing units that have similar components include, for instance, whirlpools, hot tubs, bathtubs, therapeutic baths, and swimming pools.

In addition to bathing unit components used for regulating the operation of the bathing unit system, additional features that provide added entertainment are increasingly being included as part of bathing unit systems. An example of such a feature includes lighting elements for providing visual stimulation to users of the bathing unit system. An example of a lighting element using multicolor LEDs was described in U.S. Pat. No. 6,744,223 entitled "Multicolor lamp system" issued on Jun. 1, 2004 to B. Laflamme et al. Other features include multimedia elements providing audio and/or video functionality. Examples of audio systems for spas have been described in U.S. patent publication no.: US 2002/0025050 A1, entitled "Spa Audio System Operable With A Remote Control" filed on May 24, 2001 by S. S. Macey; in U.S. patent publication no.: 2004/0047484 A1, entitled "Sound system, a speaker assembly, and a method for providing sound for a spa" filed on Sep. 5, 2003 by W. J. Gardenier et al. and U.S. patent publication no.: 2010/0070059 A1, entitled "Bathing unit control system providing multimedia functionality, telephone functionality and/or data network access functionality and bathing unit system including same" filed on Nov. 16, 2009 by B. Laflamme et al.

Most modern bathing unit control systems include a control panel that is in communication with the bathing unit controller. When the control panel is installed on a portion of the tub of the bathing unit system, for example on a portion of a spa shell, the control panel is typically referred to as a topside control panel. A user of the bathing unit system can use the control panel in order to adjust and control the activation and settings of the various bathing unit components. The control panel is typically positioned in proximity to the bathing system so that a user of the bathing system may interact with it while in the water in order to adjust and control the activation and settings of the various bathing unit components.

Positioning a control panel in proximity to the bathing unit system, for example on a portion of an outer peripheral wall of the tub of the bathing unit system, presents a challenge. While such proximity of the control panel to the bathing unit system facilitates user interactions with the control panel, this proximity increases detrimental exposures of the control panel internal and external components to moisture. As a result, this detrimental moisture exposure may increase, for example, sanitary (e.g., mildew), integrity (e.g., rust), operability/safety (e.g., water-induced short circuits) risks to the control panel, as well as other risks which can be apparent to the person of skill.

Conventional designs for spa topside control panels use mechanical buttons (keys) or touch sensitive screens for receiving user commands. A problem associated with current touch sensitive screens is that they make use of capacitive sensors to provide one or more tactile zones for associating user tactile input to software-implemented actions. Such sensors tend not to perform well in environments where there is water as they often mistake water on the screen for user inputs. As a result, in practice, the control panels equipped with touch sensitive screens often need to be positioned either away from the spa shell or on the outer lip of the spa shell so as to reduce the likelihood they will be in contact with water. However, in doing so, a user bathing in the spa cannot easily access such a control panel from inside the spa and must instead reach over the side or exit the spa, which is inconvenient. Control panels that use mechanical buttons (keys) tend to be less affected by this issue and so are often used in closer proximity to the water. However, these panels are not esthetically pleasing and, due to their physical layout, are often limited in their ability to be adapted to add new functionality over time.

Against the background described above, there is a need in the industry to provide a topside control panel and a method of using such a control panel that alleviates at least in part the problems associated with existing devices.

SUMMARY

To address at least some deficiencies noted above, a new topside control panel configuration and method of operating such control panel is proposed in the present disclosure. The new topside control panel is configured to be installed on a tub of a bathing unit system, for example on a top surface or on an inner periphery of the tub, so that it can be conveniently accessed and operated while a user is in the tub. Embodiments of the control including a display without touch-sensitive functionality may be particularly well suited in locations where the topside control panel is likely to be exposed to water, such as for example in the inner periphery of the tub. In some practical implementations, multiple topside control panels connected to a same bathing system controller may be installed in different locations of the tub to allow control from different locations in the tub and/or to allow controlling of different subsets of the bathing unit components in the bathing unit system.

In accordance with a first general aspect, a topside control panel is proposed having a combined display and control for controlling water features and other components in a bathing unit system. According to this general aspect, the topside control panel includes a display positioned on a generally circular housing portion and a ring-shaped manually operable actuator encircling the periphery of the generally circular housing portion. In some implementations, the topside control panel may be configured so that combinations of rotations and pressing actions allow the user to navigate through a menu including multiple menu layers to, amongst others, (i) select various components of the bathing unit system; (ii) select amongst various settings for the components; and/or (iii) make selections that will in turn cause the components of the bathing unit system to be deactivated and/or activated in a specific manner. The topside control panel can also be configured so that different rotations and pressing patterns (or sequences) as well as different pressing durations will result in different types of command signals being generated to control the bathing unit components in a specific manner.

Advantageously, the combined use of the ring-shaped manually operable actuator, the display presenting a multi-layer menu and manner of operating the control panel using combinations of rotations and pressing actions of the ring-shaped manually operable actuator allows maintaining the flexibility in terms of modifying/adding additional functionality while reducing the need for the display to have touch sensitive capabilities. It is however to be appreciated that while the display need not have touch sensitive capabilities, in some embodiments the display may nevertheless be constructed to include such functionality.

In accordance with another aspect, a topside control panel is provided for controlling water features in a bathing unit system, the bathing unit system including a tub holding water, a circulation system including an inlet and outlet in the tub and one or more pumps for circulating the water held in the tub through the circulation system between in the inlet and outlet, the topside control panel comprising:
 a) a housing having a generally circular housing portion including a display screen;
 b) a manually operable actuator positioned about a periphery of the generally circular housing portion and configured for triggering signals at least in part in response to displacements of the manually operable actuator, the displacements including rotations of the manually operable actuator about the periphery of the generally circular housing portion;
 c) a circuit board assembly positioned in the housing and operatively coupled to the display screen and the manually operable actuator, said circuit board assembly including one or more processors programmed for:
  i) rendering on the display screen a multi-layer menu driven interface presenting user-selectable options for controlling at least some water features of the bathing unit system, wherein at least one specific menu layer of the multi-layer menu driven interface presents options for controlling the one or more pumps;
  ii) permitting navigation through the multi-layer menu driven interface by using signals triggered at least in part by a combination of displacements of the manually operable actuator to select specific user-selectable options to arrive at the specific menu layer presenting options for controlling the one or more pumps.

In accordance with some implementations, the manually operable actuator includes an inner periphery adjacent the periphery of the generally circular housing portion and an outer periphery, the outer periphery including gripping elements for facilitating manipulation of the manually operable actuator by a user of the bathing unit system. The gripping elements may be particularly useful in cases where the hands of the user are wet. In practical implementations, the gripping elements may take various forms including physical gripping elements, such as protrusions and/or indentations located about the outer periphery of the manually operable actuator. These protrusions and/or indentations may be used independently, or in combination with, the use of gripping material applied to a portion of (or to the entire outer periphery of) the manually operable actuator. In a specific practical implementation, the gripping elements include a plurality of interleaved indentations and protrusions positioned about the outer periphery of the manually operable actuator, the plurality of interleaved indentations and protrusions forming finger gripping element for engaging fingers of the user of the bathing unit system to facilitate rotating the manually operable actuator.

Alternatively, the gripping elements may include gripping material applied to a portion of (or to the entire outer periphery of) the manually operable actuator without the use of physical gripping elements for facilitating manipulation of the manually operable actuator by a user of the bathing unit system. Any suitable type of gripping material may be used in practical implementations, including, but without being limited to, rubber, polyurethane, polyethylene and different grades of plastics (polycarbonate, etc.).

In accordance with some implementations, the manually operable actuator may be in the form of a partial arc so that it partially encircles the generally circular housing portion or, alternatively, may be a ring-shaped manually operable actuator encircling the (entire) periphery of the generally circular housing portion.

In accordance with some implementations, a first set of magnets may be arranged about an inner periphery of the manually operable actuator.

In some implementations, the signals triggered in response to the rotations of the manually operable actuator are triggered at least in part by the first set of magnets and one or more sensors positioned in the generally circular housing portion, wherein the one or more sensors are configured to generate signals conveying magnetic effects caused by the first set of magnets. The one or more processors are programmed for processing the signals generated by the sensors and conveying the magnetic effects caused by the first set of magnets to derive information conveying a direction and an amount of rotation of the manually operable actuator. In practical implementations, any suitable approach known in the art based on measured magnetic effects may be used for detecting the direction and the amount of rotation of the manually operable actuator, including for example, but not limited to, approaches relying on quantifications of Hall effects.

In accordance with some implementations, a second set of magnets may be arranged about an outer periphery of the generally circular housing portion. The first and second set of magnets are configured so as to have opposite poles. As the manually operable actuator is rotated about the generally circular housing portion, the magnetic fields created by the sets of opposing magnets in the first and second sets are configured for causing a temporary resistance and then a release, which in turn imparts a tactile effect to the manually operable actuator. Preferably the tactile effect is associated to corresponding adaptations of information presented on the user interface and serves to give tactile feedback to the users as they navigate through the multi-layer menu driven interface.

In practical implementations, the magnets in the first and seconds sets may be arranged in different suitable manners and different numbers of magnets may be included in each set. In some specific implementation, the magnets in the first set may be arranged at first regular intervals about the inner periphery of the ring-shaped manually operable actuator and the magnets in the second set may be arranged at second regular intervals about the outer periphery of the generally circular housing portion. In some non-limiting implementations, the first regular intervals may be matched to the second regular intervals so that, in a rest position, there is alignment between the magnets in each set. In addition, while in some implementations the number of magnets in the first and second sets may be the same, other implementations may use different numbers of magnets in each set depending on the tactile effect that is desirable to achieve.

While specific embodiments of the topside control panel may make use of opposing magnets as described above for imparting tactile effects on the manually operable actuator, other mechanisms for imparting a tactile effect to the manually operable actuator and/or housing may be used in alternate implementation. Such mechanisms may include without being limited to suitable components for imparting haptic feedback of the type known in the art. Such mechanisms are beyond the scope of the present disclosure and will not be described further here.

In some implementations, the manually operable actuator is configured for disengaging the periphery of the generally circular housing portion in response to a pulling force applied to the manually operable actuator, the pulling force being oriented away from the housing. Such a configuration may present a number of advantages. For example, by configuring the topside control panel so that the manually operable actuator can disengage the housing by a pulling force, simplified access to the periphery of the generally circular housing portion can be had for cleaning, installation and/or maintenance of the topside control panel. This configuration also allows for swapping the manually operable actuator with another in a case where the manually operable actuator breaks and/or if a user wishes to install a manually operable actuator having a different design (for example a manually operable actuator with a different configuration of physical gripping elements and or materials about the outer periphery of the manually operable actuator).

In accordance with some specific implementations, the manually operable actuator is configured for triggering signals at least in part in response to displacements of the manually operable actuator including rotations of the manually operable actuator about the periphery of the generally circular housing portion and tactile inputs provided by the user through the manually operable actuator. In specific practical implementations, the manually operable actuator may include difference types of tactile sensors for triggering signals in response to tactile inputs including, without being limited to, an infra-red sensor, a touch-resistive sensor, a pressure-sensitive sensor, a motion sensor and a piezo electric sensor.

In some specific examples of implementation, the tactile inputs provided by the user through the manually operable actuator may include inward displacements of the manually operable actuator between an extended position and an actuated position, the inward displacements being in a direction transverse to a direction of rotation of the manually operable actuator. In such an implementation, these inward displacements form part of the displacements of the manually operable actuator configured for triggering signals. In particular, in such implementations, the one or more processors may be programmed for permitting navigation through the multi-layer menu driven interface by using signals triggered at least in part by a combination of rotations and inward displacements of the manually operable actuator to select the specific user-selectable options to arrive at the specific menu layer presenting options for controlling the one or more pumps.

In accordance with some specific examples, the manually operable actuator is responsive to a force oriented towards the housing in the direction transverse to the direction of rotation of the manually operable actuator for moving from the extended position towards the actuated position and reverting to the extended position absent the applied force.

In some embodiments, the inward displacements of the manually operable actuator occur jointly with inward displacements of the generally circular housing portion including the display screen. The manually operable actuator may be configured to that the force may be applied to either the generally circular housing portion or the manually operable actuator.

In accordance with some practical implementations, the one or more processors may also be programmed for enabling control of the one or more pumps at least in part by permitting navigation and selection of options presented using various combinations of rotations and/or tactile inputs provided through the manually operable actuator. In some specific implementations, the options presented on the specific menu layer may be configured for permitting controlling the one or more pumps using a least one of rotations of the manually operable actuator and inward displacements of the manually operable actuator between the extended position and the actuated position. Various specific manners of controlling the pumps may be contemplated.

As a first example, the options presented on the specific menu layer may be configured for permitting controlling the one or more pumps using rotations of the manually operable actuator to modify a current speed of operation of at least one pump from the one or more pumps. For example, the one or more processors are programmed for increasing/decreasing the current speed of operation of the at least one pump in response to a rotation of the manually operable actuator in a clockwise/counterclockwise direction.

As a second example, the options presented on the specific menu layer are configured for permitting activating a specific pump amongst the one or more pumps in response to an inward displacement of the manually operable actuator between the extended position and the actuated position and for modifying a current speed of operation of the specific pump using rotations of the manually operable actuator.

As a third example, the options presented on the specific menu layer are configured for permitting activating a specific pump amongst the one or more pumps in response to a first inward displacement of the manually operable actuator between the extended position and the actuated position and for modifying a current speed of operation of the specific pump in response to a second inward displacement of the manually operable actuator between the extended position and the actuated position, the manually operable actuator reverting to the extended position between the first inward displacement and the second inward displacement. In some specific implementations, the pump being controlled may be multi-speed pumps, for example dual speed pumps, in which each sequential inward displacement of the manually operable actuator causes the speed to be modified to cycle through a set of discrete possible speeds of the pump.

As a fourth example, the options presented on the specific menu layer are configured for permitting activating a group of pumps amongst the one or more pumps in response to displacements of the manually operable actuator between the extended position and the actuated position, the group of pumps including at least two pumps and for modifying current speeds of operation of pumps in the group of pumps using rotations of the manually operable actuator. In some specific implementations, the pump being controlled may be variable speed pumps configured for operating in a generally continuous range of speeds and in which rotation of the manually operable actuator causes the speed to be modified within the operating range.

As a fifth example, the options presented on the specific menu layer are configured for permitting activating a selected number of pumps amongst the one or more pumps in response to inward displacements of the manually operable actuator between the extended position and the actuated position, the selected number of pumps corresponding to a number of inward displacements of the manually operable actuator between the extended position and the actuated position, the manually operable actuator reverting to the extended position between consecutive inward displacements.

As a sixth specific example, the options presented for controlling the one or more pumps include a set of pumping patterns available for selection, and wherein the one or more processors are programmed for permitting navigation between pumping patterns in the set of pumping patterns using rotations of the manually operable actuator to select a specific pumping pattern and for activating the one or more pumps to implement the specific pumping pattern in response to an inward displacement of the manually operable actuator between the extended position and the actuated position. In some practical implementations, the one or more processors may be programmed for modifying a current intensity and/or a current frequency associated with specific pumping pattern based on a rotation of the manually operable actuator. For example, the one or more processors may be programmed for increasing(decreasing) the current intensity and/or the current frequency in response to a rotation of the manually operable actuator being in a clockwise(counterclockwise) direction.

In accordance with another aspect, the one or more processors are programmed for dynamically adapting the multi-layer menu driven interface at least in part in response to displacements of the manually operable actuator to present information conveying at least one of:
  user selections made using the topside control panel;
  a specific menu layer in the multi-layer menu driven interface; and
  operational status information associated with components of the bathing unit system.

In some implementations, the one or more processors may be programmed for adapting the multi-layer menu driven interface rendered on the display screen at least in part based on criteria independent from signals triggered in response to displacements of the manually operable actuator, wherein adapting the multi-layer menu driven interface includes modifying the user-selectable options presented on the user interface. A number of criteria may be used to adapt the options presented including, without being limited to, current timing information (e.g. current period/time of day information; current day of week; current month; current season and/or current weather conditions (e.g. ambient temperature)) and user identification information. For example, the one or more processors may be programmed for receiving a user identification signal conveying user identification information associated to the user of the bathing unit system and for modifying the multi-layer menu driven interface to derive a custom multi-layer menu driven interface at least in part by processing the user identification information.

In some specific practical implementations, a memory device of the topside control panel may include a memory component responsive to a user identification signal carrying the user identification information received over a wireless communication link from an auxiliary device external to the topside control panel for causing a user preference update process to be performed at the topside control panel, the user preference update process modifying the multi-layer menu driven interface to derive a custom multi-layer menu driven interface.

In accordance with another aspect, a bathing unit system is provided comprising:
  a) a tub for holding water;
  b) a circulation system including an inlet and outlet in the tub;
  c) a plurality of bathing unit components including one or more pumps for circulating the water held in the tub through the circulation system between in the inlet and outlet;
  d) a controller for controlling operational settings associated with the bathing unit components; and
  e) one or more topside control panels of the type described above, the topside control panel being in communication with the controller for allowing a user of the bathing unit system to control and/or monitor operational settings of at least some of the bathing unit components in the bathing unit system.

In specific implementations, the tub for holding water includes an inner peripheral wall and at least one of the one or more topside control panels may be positioned on an upper portion of the inner peripheral wall so as to be operably accessible by a user located in the tub of the bathing unit system. It is to be appreciated that, in alternate implementations, some of all of the one or more control panels may be positioned in other suitable locations, including on an upper ledge defined by the tub or on an exterior peripheral wall.

In some specific implementations, there are two or more topside control panels in the bathing unit system including a first topside control panel and as second topside control panel, wherein the one or more processors of the second topside control panel are programmed for dynamically adapting the multi-layer menu driven interface displayed on the display of the second topside control panel in response to displacements of the manually operable actuator of the first topside control panel to present information on the second topside control panel conveying user selections made using the manually operable actuator of the first topside control panel.

In accordance with some specific implementations, the manually operable actuator is configured for triggering signals at least in part in response to displacements of the manually operable actuator including rotations of the manually operable actuator about the periphery of the generally circular housing portion and tactile inputs provided by the user through the manually operable actuator. In specific practical implementations, the manually operable actuator may include difference types of tactile sensors for triggering signals in response to tactile inputs including, without being limited to, an infra-red sensor, a touch-resistive sensor, a pressure-sensitive sensor, a motion sensor and a piezo electric sensor.

In some specific examples of implementation, the tactile inputs provided by the user through the manually operable actuator may include inward displacements of the manually operable actuator between an extended position and an actuated position, the inward displacements being in a direction transverse to a direction of rotation of the manually operable actuator. In such an implementation, these inward displacements form part of the displacements of the manually operable actuator configured for triggering signals. In accordance with another aspect, a combined display and control topside module is provided for controlling water features in a bathing unit system, wherein the topside module includes a generally circular housing portion, on which a display screen is provided presenting a multi-layer menu driven interface, and a ring-shaped manually operable actuator encircling the periphery of the generally circular housing portion, wherein:
- a) the combined display and control topside module is configured for permitting navigation through multi-layer menu driven interface displayed on the display screen using a first combination of rotations and inward displacements of the ring-shaped manually operable actuator to arrive at a pump control menu; and
- b) from the pump control menu, the combined display and control topside module is configured for enabling a user to control, using clockwise and counterclockwise wise rotations of the ring-shaped manually operable actuator, at least one of:
  - i) a speed of a variable speed pump in the bathing unit system; and
  - ii) a number of pumps being activated in the bathing unit system.

In some implementations, the pump control menu is a first pump control menu, and the combined display and control topside module is configured for permitting navigation through the multi-layer menu driven interface displayed on the display screen using a second combination of rotations and inward displacements of the ring-shaped manually operable actuator to arrive at a second pump control menu, the second pump control menu presenting the user with a set of individually selectable pumping patterns. The combined display and control topside module is configured for enabling a user to select and activate a specific pumping pattern from the set of individually selectable pumping patterns using at least one of a rotation and an inward displacements of the ring-shaped manually operable actuator. Various pumping patterns may be presented for selection in various embodiments. In practical implementations, the pumping patterns may include, for example, pumping patterns, massage patterns and/or swim spa programs.

In accordance with another aspect, a method is provided for controlling water features in a bathing unit system, the bathing unit system including a tub holding water, one or more pumps for circulating the water held in the tub and a topside control panel, the topside control panel including a housing having a generally circular housing portion including a display screen and a manually operable actuator positioned about a periphery of the generally circular housing portion and configured for triggering signals at least in part in response to displacements of the manually operable actuator. The method comprises:
- ii) rendering a multi-layer menu driven interface on the display screen, the multi-layer menu driven interface presenting user-selectable options for controlling at least some water features of the bathing unit system, wherein at least one specific menu layer of the multi-layer menu driven interface presents options for controlling the one or more pumps;
- iii) permitting navigation through the multi-layer menu driven interface by using signals triggered at least in part by a combination of displacements of the manually operable actuator to select specific user-selectable options to arrive at the specific menu layer presenting options for controlling the one or more pumps, wherein the options presented on the specific menu layer are configured for permitting controlling the one or more pumps at least in part using specific displacements of the manually operable actuator.

In specific practical implementations, wherein the displacements of the manually operable actuator triggering signals may include rotations of the manually operable actuator about the periphery of the generally circular housing portion and/or inward displacements of the manually operable actuator between the extended position and the actuated position.

In some examples of implementation, the display assembly may include a display screen portion and the processor may be programmed for causing the display screen to display information conveying the specific setting selected in response to a specific displacement of the manually operable actuator.

All features of embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Drawings.

BRIEF DESCRIPTION OF THE DRAWINGS

A detailed description of the embodiments of the present invention is provided herein below, by way of example only, with reference to the accompanying drawings, in which.

Figure 1:
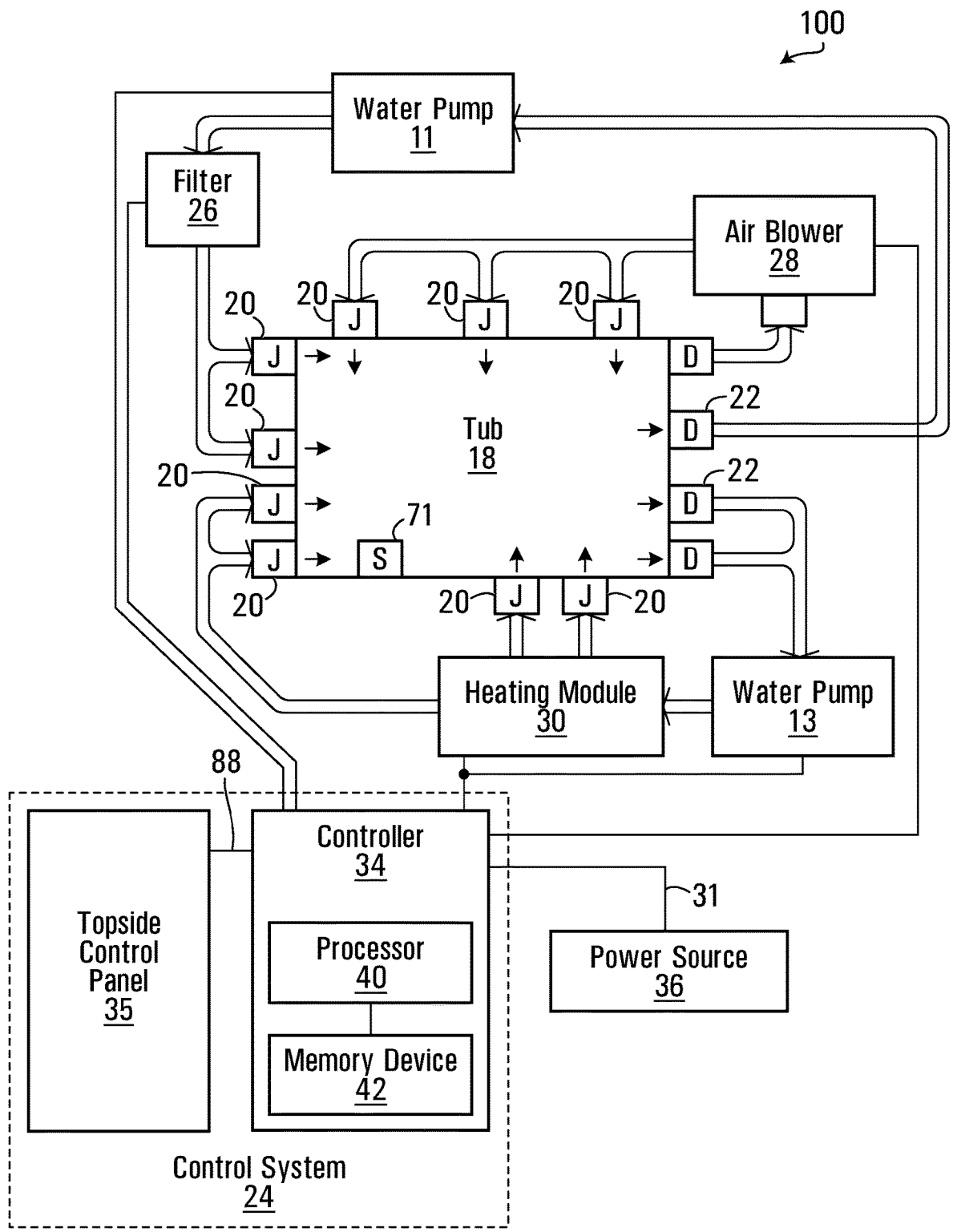
FIG. 1 shows a block diagram of a bathing system equipped with a topside control panel in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a bathing unit system. It is to be understood that the term "bathing unit system", as used for the purposes of the present description, refers to spas, whirlpools, hot tubs, bathtubs, therapeutic baths, swimming pools and any other type of bathing unit that can be equipped with a controller and associated control interface for controlling various operational settings of component in the bathing unit system.

In addition, the description below focusses on a very specific embodiment of a topside control panel including a manually operable actuator configured for triggering signals in response to displacements of the manually operable actuator including rotations of the manually operable actuator and inward displacements of the manually operable actuator between the extended position and the actuated position. It is to be appreciated that other embodiments are possible wherein instead of providing for an inward displacement of the manually operable actuator, other types of tactile input provided by a user through the manually operable actuator may be contemplated. For example, such tactile input may not require an inward (physical) displacement of the manually operable actuator but may instead be triggered through proximity, touch and/or pressure applied to the manually operable actuator and/or to other portions of the topside control panel. In such alternative embodiments, the topside control panel may be equipped with one or more suitable sensors for detecting proximity, touch and/or pressure including, without being limited to, infra-red, touch-resistive, pressure-sensitive, motion and piezo electric sensors. These alternative embodiments will become apparent to the person skilled in the art in view of the present description and will therefore not be described in further detail here.

FIG. 1 illustrates a block diagram of a bathing unit system 100 equipped with a control system having a topside control panel 35 in accordance with a specific example of implementation of the present invention. For the purpose of simplicity, in the present example, the bathing unit system 100 will be described as having a single topside control panel 35 however it is to be appreciated that alternate embodiments may include two or more topside control panels that may be used to control operations of components in the bathing unit system. Each of the two or more topside control panels may operate independently from other topside control panels and/or the two or more topside control panels may interact with one another, for example by modifying information presented on the display screen of one control panel in response to actions taken at another control panel.

The bathing unit system 100 includes a water receptacle or tub 18 for holding water, a set of drains 22 and a control system 24 comprised of a controller 34 and the topside control panel 35. In the specific embodiment shown in FIG. 1, the bathing unit system 100 further includes a set of bathing unit components (also referred to hereinafter as "comfort components") comprising a heating module 30, two water pumps 11 and 13, a plurality of jets 20, a filter 26 and an air blower 28. It should be understood that, in alternate embodiments, the bathing unit system 100 could include more or less of the same or of different bathing unit components. For example, although not shown in FIG. 1, the bathing unit system 100 may include an ozonator, a lighting system for lighting up the water in the tub 18, multimedia devices such as an MP3 player, a CD/DVD player as well as any other suitable device. The bathing unit system 100 may include one, two or more pumps 11 and/or one, two or more pumps 13.

In normal operation, water flows from the bathing unit tub 18, through the drains (or outlets) 22 and is pumped by water pump 13 through the heating module 30 where the water is heated. The heated water then leaves the heating module 30 and re-enters the bathing unit tub 18 through jets (or inlets) 20. In addition, water flows from the bathing unit tub 18, through different drains 22 and is pumped by water pump 11 through filter 26. The filtered water then re-enters the bathing unit tub 18 through different jets 20. Water can flow through these two cycles continuously while the bathing unit system 100 is in operation. Optionally, water can also flow from the bathing unit tub 18 through one or more drains 22 to an air blower 28 that is operative for delivering air bubbles to water that re-enters the bathing unit tub 18 through jets 20.

In the non-limiting embodiment shown, the control system 24 includes a controller 34 including circuitry for controlling the operational settings of the different components in the set of bathing unit components 11, 13, 20, 26, 28, 30. In the embodiment depicted in FIG. 1, the circuitry for controlling the operational settings of the different components is shown as including a processor 40 and a memory 42 that are in communication with one another over a communication bus. The processor 40 may be configured for accessing and processing program instructions stored within the memory 42 for enabling the controller 34 to control the set of bathing unit components 11, 13, 20, 26, 28 and 30 at least in part on the basis of those program instructions and commands received from a user, for example via the topside control panel 35.

As depicted, the controller 34 receives electrical power from an electric power source 36 that is connected to the controller 34 via service wiring 31. The power source 36 supplies the controller 34 with any conventional power service suitable for residential or commercial use. The controller 34 may then controls the distribution of power supplied to the various bathing unit components 11, 13, 20, 26, 28, 30 and to the topside control panel 35 in order to cause a desired operational settings to be implemented. Manners in which the controller 34 controls the operation of the individual bathing unit components of the bathing unit system, such as for example the jets 20, the drains 22, the heating module 30, the water pumps 11 and 13, the filter 26, the air blower 24, a valve jet sequencer for massage, a variable speed pump with a pre-programmed massage setting, a water fall, an aroma therapy device and an atomizer, as well as any lighting and multimedia components, are well known in the art and are not critical to the invention and as such will not be described in further detail here.

In a non-limiting implementation, the power source 36 can supply 240 volts (V) AC to the controller 34 via service wiring 31. In an alternative non-limiting implementation, the power source 36 can supply 120 volts (V) AC to the controller 34 via service wiring 31. In yet a further alternative non-limiting implementation, the power source 36 can supply 120 Volts and 240 Volts AC to the controller 34 via service wiring 31. It is to be appreciated that other voltage supply values or voltage supply combinations, for example depending on geographical location, are possible. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

The controller 34 is in communication with the topside control panel 35 over communication link 88, which may be a wire line data bus or a wireless communication link for example, for receiving commands originating from a user input provided at the topside control panel 35. In some implementations, the controller 34 may also be configured for receiving commands from auxiliary devices (not shown in FIG. 1) external to the bathing unit system 10, for example via RF signals, infrared signals, or via a network communication (over an Intranet or the Internet) in accordance with any suitable method. One approach is described is U.S. Patent publication No. US20130166965 A1 entitled "Method and system for providing remote monitoring and control of a bathing system" Other approaches are described in U.S. Pat. No. 8,644,960 entitled "Method and system for providing ambiance settings in a bathing system". The contents of the aforementioned documents are incorporated herein by reference. These and various other approaches and systems for remotely controlling bathing unit systems are known in the art and not critical to the invention and will thus not be described further here.

As mentioned above, the bathing unit system 100 is equipped with a topside control panel 35 in accordance with a specific example of implementation of the invention. The topside control panel 35 provides an interface for allowing a user of the bathing unit system 100 to provide user commands to the controller 34 of the control system 24. The topside control panel 35 includes a combined display/manually operable control for allowing a user to control water features (for e.g. but without being limited to: pumps for achieving circulation, jetting, massage and the like, heaters for heating the water, amongst) and other components in bathing unit system 100. As will be presented later on in this disclosure, in a preferred embodiment of the topside control panel 35, the display is positioned on a generally circular housing portion and a manually operable actuator encircles at least in part the periphery of the generally circular housing portion. The topside control panel 35 may be configured so that rotations and pressing actions allow the user to navigate through a menu including multiple menu layers to, for example, (i) select various components of the bathing unit system 100; (ii) select amongst various settings for the components; and/or (iii) make selections that will in turn cause the components of the bathing unit system 100 to be deactivated and/or activated in a specific manner. The topside control panel 35 can also be configured so that different rotations and pressing patterns (or sequences) as well as different pressing durations will result in different types of command signals being generated to control some of the bathing unit components in a specific manner. In specific practical implementations, via the topside control panel 35, a user may be able to enter commands that can be implemented by the controller 34 for controlling the activation and operational settings of the various bathing unit components, for monitoring the operational status of the bathing unit components as well as for monitoring operational characteristics of the bathing unit system, such as water temperature, ambient temperature and/or water quality for example.

In particular, the topside control panel 35 is configured for sending signals to the bathing unit controller 34 over a communication link 88 for controlling operational settings of bathing unit components in the system 100. Similarly, the topside control panel 35 is configured for receiving over communication link 88 incoming signals from the bathing unit controller 34, which can include signals conveying operational settings of the bathing unit system 100 and well as various metrics obtained through sensors (e.g., water temperatures sensor 71, ambient temperature sensor, water quality metrics sensors etc.). In some implementations, the topside control panel 35 may also be configured to receive from the bathing unit controller 34 data conveying user identification information associated with a user of the bathing unit system. As such, via the topside control panel 35, a user is able to enter commands that can be implemented by the controller 34 for controlling the activation and operational settings of the various bathing unit components.

In specific practical implementations, the topside control panel 35 provides an interface that allows a user to enter commands for causing the controller 34 to control various operational settings of the bathing unit components 11, 13, 20, 26, 28, 30 in accordance with the preferences of a user. Some non-limiting examples of operational settings include temperature control settings, pump speed control, massages setting, ambience settings, jet control settings, and lighting settings, among other possibilities. In a non-limiting embodiment where the bathing unit is connected to entertainment and/or multimedia modules, the operational settings of the bathing unit may also include audio settings and video settings, amongst others. Consequently, the expression "operational settings", for the purpose of the present invention, is intended to cover operational settings for any suitable bathing unit component, or group of components, that can be operated by a user of the bathing unit system 100.

The topside control panel 35 may further present on its display screen a menu driven interface through which a user can navigate and be presented with different sets of selectable options, wherein each option being associated with either another menu layer or with specific operational settings for different bathing unit components. Upon selection of one of the presented options, the bathing unit system is caused to apply corresponding operational settings to one or more bathing unit components in the system in order to achieve a corresponding desired total effect.

As will become apparent from the present description, the topside control panel 35 aims to provide functionality for allowing a user to cause the bathing unit system 100 to operate in accordance with an operational setting by way of a combination of rotations and pressing actions performed at the topside control panel 35.

Example of processes and component for achieving such functionality will be described below in the present document with reference to FIGS. 4 to 11B.

For the purpose of simplicity and conciseness, while the topside control panel 35 may provide many different functions, the description from hereon will focus on the functionality and components pertaining to allowing a user to cause the bathing unit system 100 to operate to select and implement desired changes to operational settings of pumps 11 and 13 and to jets 20. It is to be understood that such functionality may be provided instead of, or in combination with, other functionality in the topside control panel 35 through suitable software and hardware components as will become readily apparent from the person skilled in the art in view of the description.

Control Panel Processing Components

Figure 2:
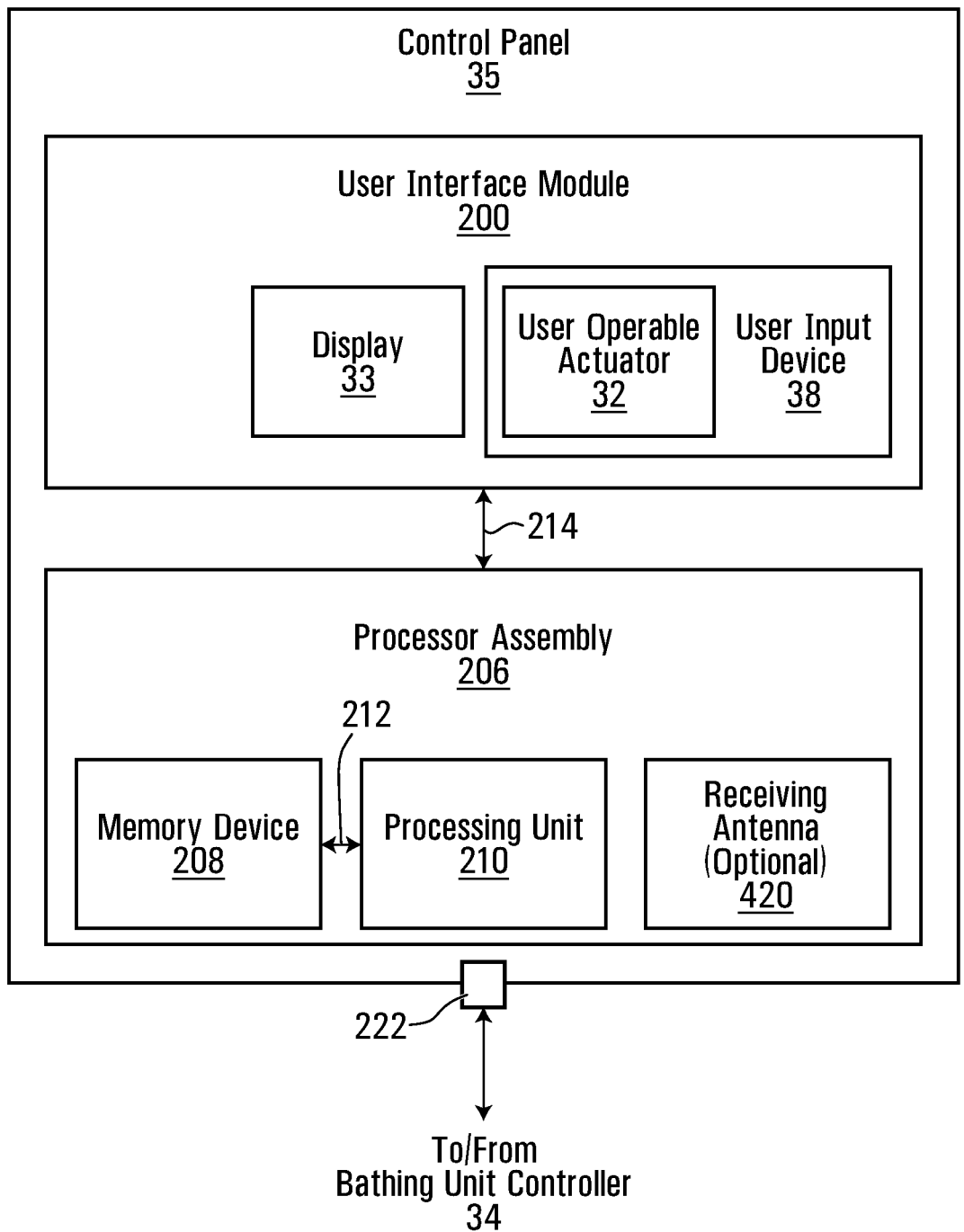
FIG. 2 shows a functional block diagram of a topside control panel for the bathing system of FIG. 1 in accordance with a specific example of implementation of the present invention, the topside control panel including a processor assembly.

FIG. 2 shows a functional block diagram of the topside control panel 35 of the bathing system 100 in accordance with a specific example of implementation of the present invention.

As depicted, the topside control panel 35 includes a user interface module 200 and a processing assembly 206 in communication with one another over communication link 214. The processing assembly 206 may comprise one or more processors in communication with the user interface module 200. The topside control panel 35 may also include one or more communications interfaces for receiving or sending data to external electronic devices. In the embodiment depicted in FIG. 2, the topside control panel 35 includes a communication interface 222 for allowing the topside control panel 35 to communicate with the controller 34 (shown in FIG. 1) by sending and/or receiving signals to/from the controller 34 over communication link 88 (shown in FIG. 1). In specific practical implementations, the communication interface 222 may be a wired interface so that the communication between the topside control panel 35 and the controller 34 is made over a wire-line link. Alternatively, the communication interface 222 may be a wireless interface so that the communication between the topside control panel 35 and the controller 34 is made over a wireless link, such as a RF link for example. Additional communication interfaces may also be provided at the topside control panel 35 in alternative embodiments.

User Interface Module 200

The user interface module 200 provides components for enabling interactions with a user of the bathing unit system 100, including receiving information from and conveying information to the user. In the embodiment depicted, the user interface module 200 comprises one or more user input devices 38, including a manually operable actuator 32, and a display screen 33. The display screen 33 is configured for presenting information on a user interface, such as for example a graphical user interface (GUI), based on signals received from the processing assembly 206. The user interface may present the user with information pertaining to an operational status of the bathing unit system 100, which may include for example water temperature and operational status of one or more specific components of the bathing unit system, for example. In addition, the user interface may present the user with various selectable control options to allow the user to navigate through a menu driven interface presented on the display screen 33 and/or control various bathing unit components of the bathing unit system by providing user inputs through the one or more user input devices 38. In this regard, the user interface may implement a multi-layer menu driven interface including a plurality of different menu layers through which a user can navigate using the one or more user input device 38 in order to access a specific desired menu layer presenting the user with desired information and/or presenting the user with a specific set of user-selectable options for allowing the user to provide inputs for adjusting and activating operational settings of one or more of the bathing unit components in the system 100.

Optionally, in addition to the manually operable actuator 32, the one or more user input devices 38 may include other components for allowing user to provide inputs in different ways. Such user input devices may include, without being limited to, one or more of: a wireless port, such as for example a radio frequency (RF) port, configured for receiving user information over an RF link; an optical port configured for detecting movements so as to permit a user to control components of the bathing unit system using for example hand gestures; an audio input so as to permit a user to control components of the bathing unit system using voice; and ultrasound, amongst others. In addition, while current touch sensitive screens tend to perform poorly near water, some embodiments of topside control panel 35 may include as part of the one or more user input devices 38 a display screen with touch-sensitive capabilities in particular for cases where the topside control panel 35 may be installed away from the tub. The person skilled in the art will appreciate in view of the present disclosure that any suitable user input device, or combination of devices, may be incorporated into the topside control panel 35 in addition to manually operable actuator 32. The functionality and structure of the user input devices other than the manually operable actuator 32 are generally known in the art and, in any event, are beyond the scope of the present disclosure and, as such, they will not be described in further detail here.

As will be described later below, the manually operable actuator 32 allows a user to cause the topside control panel 35 to generate control signals permitting navigation through a multi-layer menu shown on the display 33 using signals triggered by a combination of rotations and inward displacements of the manually operable actuator 32 to select desired options to arrive at the specific menu layer presenting options for controlling the pumps 11 and 13 and the jets 20 either directly or controlling the pumps by selecting programs (such as for example swim-spa programs and/or massage programs and/or pumping patterns) that corresponding to specific operational settings of one or more of the pumps 11 and 13 and the jets 20.

Processing Assembly 206

As mentioned above with reference to FIG. 2, the user interface module 200 is in communication with the processing assembly 206 (which may include one or more processors) over communication link 214. The processing assembly 206 includes suitable hardware, firmware and/or executable software code for implementing various functions for the topside control panel 35.

In the embodiment depicted in FIG. 2, the processing assembly 206 includes a memory device 208 and a processing unit 210 in communication with one another over a communication bus 212.

The memory device 208 stores program instructions executable by the processing unit 210 as well as data and may be comprised of a single memory unit or of a plurality of memory units. When the memory device 208 is comprised of a plurality of memory units, the memory units may be of a same type or of different types.

As part of the data, the memory device 208 may store a set of settings including one or more ambience settings and/or massage programs and/or swim-spa programs and/or pumping patterns, where each setting is associated with a corresponding set of operational settings for bathing unit components in the bathing unit system 100, including operational settings for one or more of the pumps 11 and 13 and the jets 20 to obtain a desired total effect for the bathing unit system 100.

More specifically, information conveying different settings may be stored in the memory device 208 and may be pre-programmed, for example at the time of manufacturing of the topside control panel 35 or through a user- or manufacturer-initiated software update process. Alternatively, or in addition to the above, one or more of the settings stored in memory device 208 may be programmed by a user through the user interface module 200 or via another suitably programmed remote user computing device. For example, pumping patterns and/or massages programs may be programmed through the user interface module 200 or via another suitably programmed remote user computing device in any suitable manner known in the art. Alternatively, some or all the operational setting associated with one or more of the settings may be stored on a memory device external to memory device 208, such as for example on a portable memory device or, alternatively, in the memory device 42 of the controller 34 (shown in FIG. 1) and be electronically accessible via the topside control panel 35.

In practical implementations, the set of settings may include at least one ambiance setting associated with different types of bathing unit components; for example, heating module 30, water pumps 11 and 13, air blower 28, lighting units (not shown), audio system (not shown), and the like. In an alternate embodiment, the set of settings may include settings associated with different types of pumps and/or and jets 20 in the bathing unit system 100.

It should be appreciated that one or more bathing unit components may be associated to each type of bathing unit component may include, and the topside control panel 35 may be configured to include pre-programmed operational settings for the multiple bathing unit components of a given type of bathing unit component.

The processing unit 210, which may include one or more processors, is in communication with the memory device 208 and is configured for accessing and processing program instructions and data stored within the memory device 208. The program instructions stored in the memory device 208, when executed by the processing unit 210, may implement at least some functions of the topside control panel 35 including, for example but without being limited to, the processing of signals originating from the user interface module 200. For example, the processing unit 210 may process a signal generated in response to actuation of the manually operable actuator 32, such as a combination of rotations and/or inward displacements of the manually operable actuator 32, to either cause display signals to be sent to the display 33 to adjust information presented on the user interface and/or to generate suitable control commands to be sent to the bathing unit controller 34 to control operational settings in the bathing unit system in a specific manner. For example, the program instructions stored in the memory device 208 may implement a menu driven interface through which a user can navigate by actuating the manually operable actuator 32 in a specific way and be presented on the display device with a specific set of selectable options. As another example, the processing unit 210 may process signals originating from the bathing unit controller 34 in order to derive display signals to be sent to the display 33 in order to present on the user interface specific information. For example, the signals originating from the bathing unit controller 34 may convey status information and/or notifications pertaining to the operational status one or more of the bathing unit components in the bathing unit system 10 and/or information obtained from sensors in the bathing unit system (e.g., water temperature, ambient temperature, water quality and the like). Functions of the type described above are well known in the field of bathing unit systems and therefore will not be described further here as they may be implemented in accordance with any suitable manner known in the art.

The specific setting selected from the set of settings using a combination of rotations and/or inward displacements of the manually operable actuator 32 may correspond to a specific pump setting amongst a plurality of pump settings. The specific pump setting may be specified in terms of intensity or pump speed. Alternatively, the pump setting may convey a pumping pattern including parameters such as intensity, duration and/or frequency as well as specific variations over the duration of the pattern including variations in intensity, duration and/or frequency. In a non-limiting implementation, the specific pump setting corresponds to a pump setting most recently used when operating the bathing unit system. The pump setting can include settings of intensity and frequency of one or more of the pumps. In such a case, the processing unit 210 may be programmed to store information identifying one or more of the most recently selected pump settings in the memory device 208. The pumping pattern may have been defined and/or selected in any suitable manner when operating the bathing unit system. In such a case, the processing unit 210 may be programmed to select the pumping patterns setting most recently used to operate the bathing unit system. In another embodiment, the selection may be based on a randomization process to select a corresponding one amongst one or more most recently used pump settings. It is to be understood that a myriad of other implementations of the selection of a corresponding one of the one or more of the last used pump settings can be employed.

In a second example, the specific pump setting selected from the set of pump settings corresponds to a default pump pattern. The default pump setting may be pre-programmed in the memory device 208 and selected (for example at the time of manufacturing) or may be programmed and/or selected as the default pump setting by a user of the bathing unit system through the user interface module 200 (shown in FIG. 2) by providing suitable user interface functionality and/or through any other suitable manner, for example by using a remote or auxiliary device to upload information conveying pump settings in which at least one pump setting is identified as a default pump setting.

In some implementations, at least some pump settings in the set of pump settings stored in the memory device 208 may be associated to respective timing information, for example: respective days of the week, respective times of the year, respective periods of the day, respective seasons of the year, respective months and/or respective times (hours, minutes) for example. The timing information conveys which set of pump settings should be favored when a selection is to be made and/or the timing information may be used to customize options presented to the user and made available for selection on the user interface of the display 33. The timing information with which are associated at least some pump settings may be pre-programmed in the memory device 208 and pre-selected (for example at the time of manufacturing) or may be programmed and/or selected by a user of the bathing unit system through the user interface module 200 (shown in FIG. 2) by providing suitable user interface functionality and/or using any other suitable manner, for example by using a remote or auxiliary device to upload into the memory device 208 information conveying pump settings in which one or more pump settings are associated to respective timing information. In such a case, the processing unit 210 may be programmed to process current timing information to select a specific pump setting from the set of set of pump settings stored in the memory and/or to select a subset of pump settings that will be presented and made available for selection via the user interface of the top-side control panel 35. The current timing information may convey one or more of current day of the week, current period of the year, current period of the day (e.g. morning, afternoon, night), current season of the year, current month and/or current time (hours and/or minutes) for example. In this manner the specific pump setting selected may vary, for example, according to the time of day (e.g., morning or evening or particular hour/minute) or the day of the week (e.g., weekday or weekend) or month of year and/or or season (e.g., winter months or summers months). For example, the intensity of the jets (as well as other settings such as the type of music played) may be different according to whether the bathing unit system is being used in the morning or in the evening or whether the bathing unit system is being used on a weekday or during the weekend. In a practical example, when the user performs a pressing action and causes an inward displacement of the manually operable actuator 32 on a Monday evening after work, say at 7 pm, the processing unit 210 may process information associated with the current timing information, i.e. the time of day, the day in week, to select the specific pump setting from the set of pump settings stored in the memory device 208, for example, the specific pump setting associated with "work day" (Monday) and "after" (7 pm), namely "after work" pump settings. In another example, when a user actuates the manually operable actuator 32 on a Saturday afternoon of the month of July, say at 2 pm, the processing unit 210 processes information associated with the current timing information to select, for example, the pump setting associated with "non-work day" (Saturday), "summer" (July in the Northern hemisphere) and "day" (2 pm), namely "Beach party".

In some implementations, at least some pump settings in the set of pump settings stored in the memory device 208 may be associated to respective ambient temperatures or ambient temperature ranges. The ambient temperatures or ambient temperature ranges convey at which ambient temperatures associated pump settings should be favored when selections are made and/or a current ambient temperature may be used to customize options presented to the user and made available for selection on the user interface of the display 33. The ambient temperatures or ambient temperature ranges to which are associated at least some pump settings may be pre-programmed in the memory device 208 and pre-selected (for example at the time of manufacturing) or may be programmed and/or selected by a user of the bathing unit system through the user interface module 200 (shown in FIG. 2) by providing suitable user interface functionality and/or using any other suitable manner, for example by using a remote or auxiliary device to upload information conveying pump settings in which one or more pump settings are associated to respective time periods. In such implementation, the topside control panel 35 (shown in FIG. 2) may include (or be in communication with) an ambient temperature sensor in order to obtain measurements conveying a current ambient temperature. In such a case, the processing unit 210 may be programmed to process ambient temperature measurements obtained by the ambient temperature sensor to select a specific pump setting from the set of set of pump settings stored in the memory device 208/or to select a subset of pump settings that will be presented and made available for selection via the user interface of the top-side control panel 35. In this manner selection of a specific pump setting may vary according to a measured ambient temperature (e.g., warm day, cold day, sunny, cloudy, humidity level and the like). Other variants of implementation are possible and will become apparent to the person skilled in the art in view of the present description.

In some implementations, at least some pump settings in the set of pump settings stored in the memory device 208 may be associated to respective user identifiers. The user identifiers may specify which pump settings should be favored for different users of the bathing unit system and/or a specific user identifier may be used to customize options presented to the user and made available for selection on the user interface of the display 33. In such implementations, the selection of the specific pump setting from the set of pump settings stored in the memory device may be performed at least in part by processing information associated with a user identity. For example, the memory device 208 can include the "Jen" and the "Ben" pump settings, where each pump setting is associated with a particular user (i.e., each one of "Jen" and "Ben"). The user identifiers to which are associated at least some pump settings may be programmed and/or selected by a user of the bathing unit system through the user interface module 200 by providing suitable user interface functionality and/or using any other suitable manner, for example by using a remote or auxiliary device to upload information conveying pump settings in which some pump settings are associated with respective user identifiers. In some specific embodiments, the user identifiers may be associated to auxiliary electronic devices that users may carry or wear when using or being in proximity to the bathing unit system (for example smart phone, smart watch, wearable electronic activity tracker (such as a fitness band) and/or any other suitable device). In an alternative embodiment, the user identifiers may be associated to auxiliary electronic devices that may be implanted in users, such as for example an RFID or NFC chip implanted in a portion of a user's body (for example in a user's hand, arm, leg or other suitable body part). Such devices are commercially available. For example, the company Dangerous Things provides a 13.56 MHz ISO14443A & NFC Type 2 NTAG216 RFID chipset that is encased in a 2×12 mm cylindrical biocompatible glass casing and comes pre-loaded in an injection syringe assembly. It is to be appreciated that these are only examples and that other devices may be used to allow user identification information to be obtained.

In cases where user identification information is used as a criterion to select a specific pump setting or to customize options presented to the user and made available for selection on the user interface of the display 33, the processing unit 210 may be programmed to process information associated with a user identity to select the specific pump setting from the set of set of pump settings stored in the memory device 208. In this manner the specific pump setting selected may vary according to the user of the bathing unit system so that a distinct desired total effect may be achieved depending on who is using the bathing unit system.

In some practical implementations, the information associated with the user identity may be received at the topside control panel 35 via a user identification signal, which may originate from an auxiliary device external to the bathing unit system 100 (shown in FIG. 1).

In some specific implementations, the user identification signal may be transmitted over a wireless communication link, such as for example a radio frequency (RF) link, directly to the topside control panel 35. In such implementation, the control panel may include a receiving antenna (shown in FIG. 2) configured for establishing a communication link with the auxiliary device. The auxiliary device may be any suitable device capable of communicating information conveying user identity information such as, for example but without being limited to, a smartphone, a smartwatch, a wearable electronic activity tracker (such as a fitness band) and/or a near-field communication (NFC) or RFID enabled device. As mentioned above, in a specific practical example of implementation, the auxiliary device may be in the form of an RFID or NFC chip implanted in a portion of a user's body (for example in a user's hand, arm, leg or other suitable body part). In a non-limiting implementation, the user identifiers may convey media access control addresses (MAC address) associated to the auxiliary devices and at least some pump settings stored in the memory device 208 (shown in FIG. 2) may be associated to respect MAC addresses thereby indirectly associating pump settings to specific users via the electronic devices they may be carrying and/or wearing. Any suitable communication protocol and associated software/hardware component may be provided to allow the topside control panel 35 to communicate with the auxiliary device. In a non-limiting example of implementation, a protocol suitable for short range communication, such as Bluetooth for example, may be used.

Figure 3:
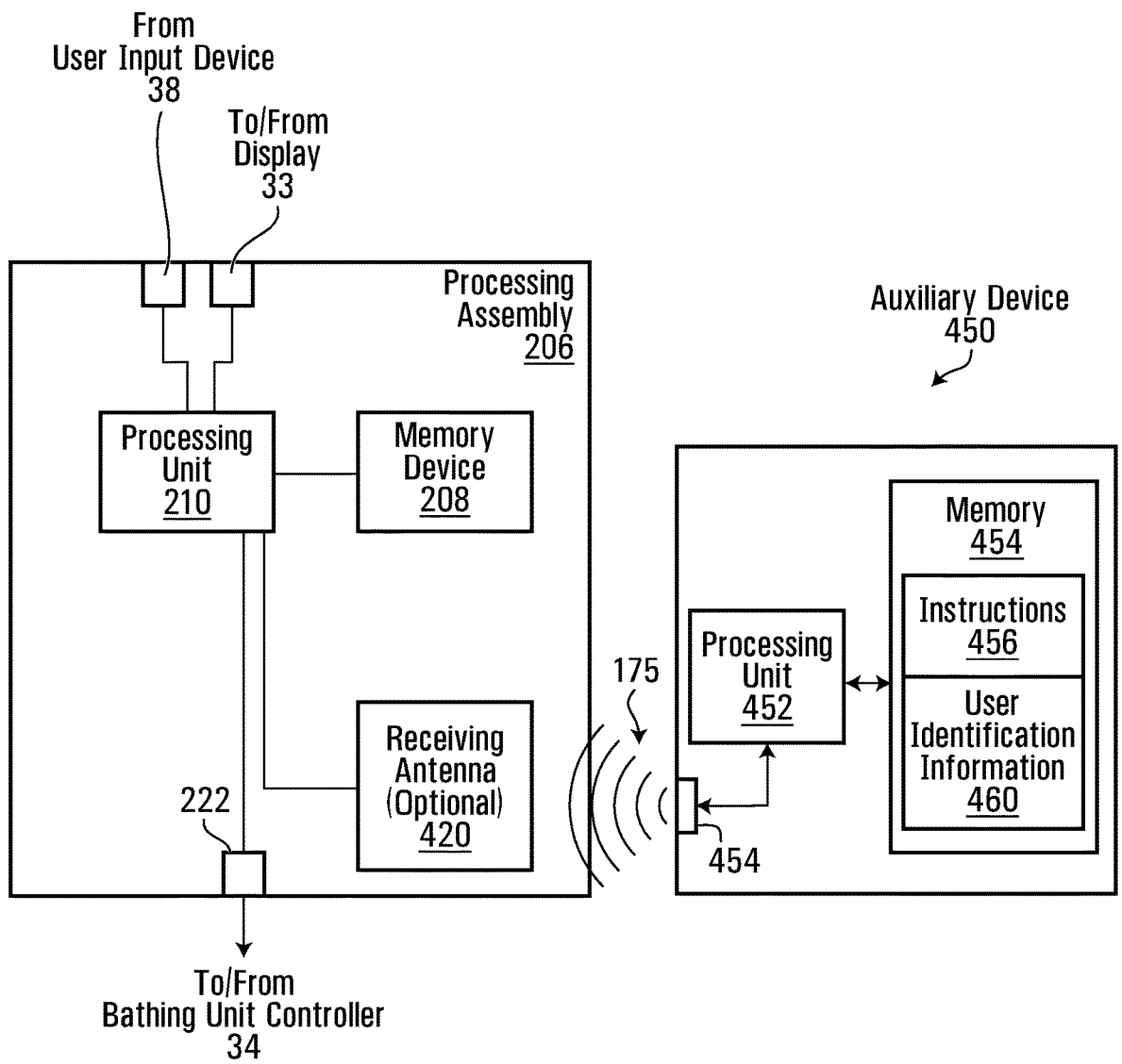
FIG. 3 shows a functional block diagram of the processing assembly of the control panel of FIG. 2, in accordance with a specific example of implementation of the present invention, together with a functional block diagram of an external auxiliary device.

While the receiving antenna for receiving user identification information has been shown in FIGS. 2 and 3 as being a component of the topside control panel 35, it is to be appreciated that such a device may be positioned elsewhere in the bathing unit system. In such an implementation, rather than being transmitted to the topside control panel 35 directly from an auxiliary device 450, the user identification signal may be transmitted over a wireless communication link to the topside control panel 35 through one or more other component of the bathing unit system 100, such as for example through the controller 34 of the bathing unit system 100 and/or through an audio/visual component of the system 100. In implementations of this alternate type, the controller 34, audio/visual component (not shown) and/or other component of the bathing unit system 100 (shown in FIG. 1) may be equipped with hardware and software components suitable to allow establishing a wireless communication link with the auxiliary device (to receive the user identification signal) and to establish another communication link with the topside control panel 35 over which data conveying the user identity may be transmitted. For example, a communication antenna may be positioned at the controller 34 so that such user identification information may be received at the controller 34 and the controller 34 may be programmed to transmit data conveying the user identification information to the topside control panel 35 over a communication link so that such information is received by the topside control panel 35 at port 222 (shown in FIG. 2). Other variants of implementation are possible and will become apparent to the person skilled in the art in view of the present description.

In some specific practical implementations, the criteria for selecting a specific pump setting from the set of pump settings stored in the memory device 208, or to customize options presented to the user and made available for selection on the user interface of the display 33, may be used independently or in combination. For example, a specific pump setting, or options presented to the user and made available for selection, may be associated to a specific user identifier and to certain timing information (time of day and/or day of the week). Many other combinations are possible and will become apparent to persons skilled in the art in light of the present document.

FIG. 3 shows a functional block diagram of the processing assembly 206 of the topside control panel 35 of FIG. 2 together with a functional block diagram of an auxiliary device 450 suitable for providing user identification information. The auxiliary device 450 and the processing assembly 206 are configured to establish a communication link 175 there between for enabling the processing assembly 206 to receive information from, and/or transmit information to, the auxiliary device 450. In particular, the auxiliary device 450 may be configured for transmitting user identification information 260, which may be stored in a memory 454 of the auxiliary device 450. The memory 454 of the auxiliary device 450 may also store suitable instructions 456, which when executed by processing unit 452, allow for the transmittal of user identification information 460 to the processing assembly 206 over communication link 175. The communication link 175 may be a wireless communication link, such as for example a short-range radio frequency (RF) link. The auxiliary device may be any suitable device capable of communicating information conveying user identity such as, for example but without being limited to, a smartphone, a smartwatch, a wearable electronic activity tracker (such as a fitness band) and/or a near-field communication (NFC) enabled device. In a specific practical example of implementation, the auxiliary device may be in the form of an RFID or NFC chip implanted in a portion of a user's body (for example in a user's hand, arm, leg or other suitable body part). Any suitable communication protocol and associated software/hardware component may be provided at the topside control panel to allow the topside control panel to receive communications from the auxiliary device. In a non-limiting example of implementation, hardware and a protocol suitable for short range communication, such as Bluetooth for example, may be used. In a non-limiting implementation, the user identifiers may convey media access control addresses (MAC address) associated to the auxiliary devices. It will however be appreciated that the user identifiers may be of different form such as for example usernames, e-mail addresses or any other mechanism for allowing information conveying an identity of a user of the bathing unit system 100 to be conveyed to the processing assembly 206.

As yet another example, user identity information may be obtained at the topside control panel 35 via a fingerprint taken from the user of the bathing unit. In such cases, the user identification signal received at the topside control panel 35 may be in the form of a fingerprint scan and the topside control panel 35 may be equipped with suitable hardware for generating the fingerprint scan, such as a fingerprint scanner, and suitable software for processing the figure print scan in order to use the fingerprint scan as an indicator of user identity. In specific practical implementations, the fingerprint scanner may be located on the topside control panel 35 so that a user may place his/her finger on the fingerprint scanner for scanning prior to using the topside control panel 35.

Other examples of implementations will become apparent to the reader in view of the teachings of the present description and as such, will not be further described here.

Topside Control Panel 35 Physical Structure

As will be appreciated, the topside control panel 35 described with reference to FIGS. 2 and 3, may be embodied in many different manners in practice. A specific example of implementation will now be described with reference to FIGS. 4 to 10B. It is to be understood that these examples are merely presented to illustrate manners in which some of the concepts described above may be implemented in practical embodiments. Other embodiments will become apparent to the person skilled in the art in light of the present description FIGS. 4, 5, and 6A to 6E show a specific implementation of a topside control panel 300, analogous to the topside control panel 35 shown in FIG. 2. The topside control panel 300 includes a housing including generally circular housing portion 305. The housing includes a base 340 and upper portion 345 (best shown in FIGS. 5 and 6A). The base 340 in this specific embodiment is shaped and configured to mount the topside control panel 300 into a portion of a wall of a tub 318 (analogous to tub 18 shown in FIG. 1). The base 340 is fixed to the tub 318 and does not move with respect thereto.

Figure 6A:
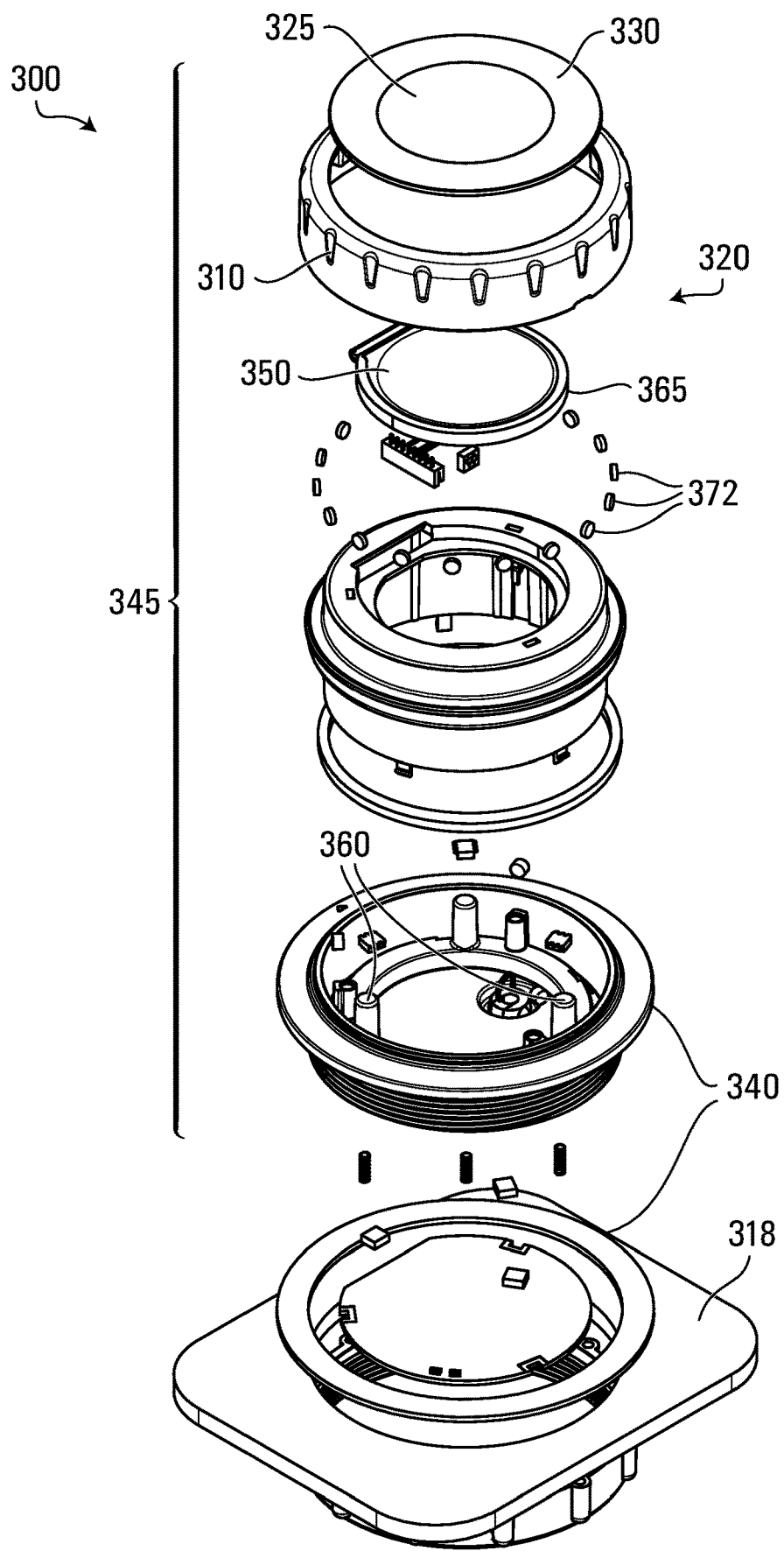
FIG. 6A shows an exploded view of the topside control panel of FIG. 4 in accordance with a specific practical example of implementation of the present invention.
Figure 6B:
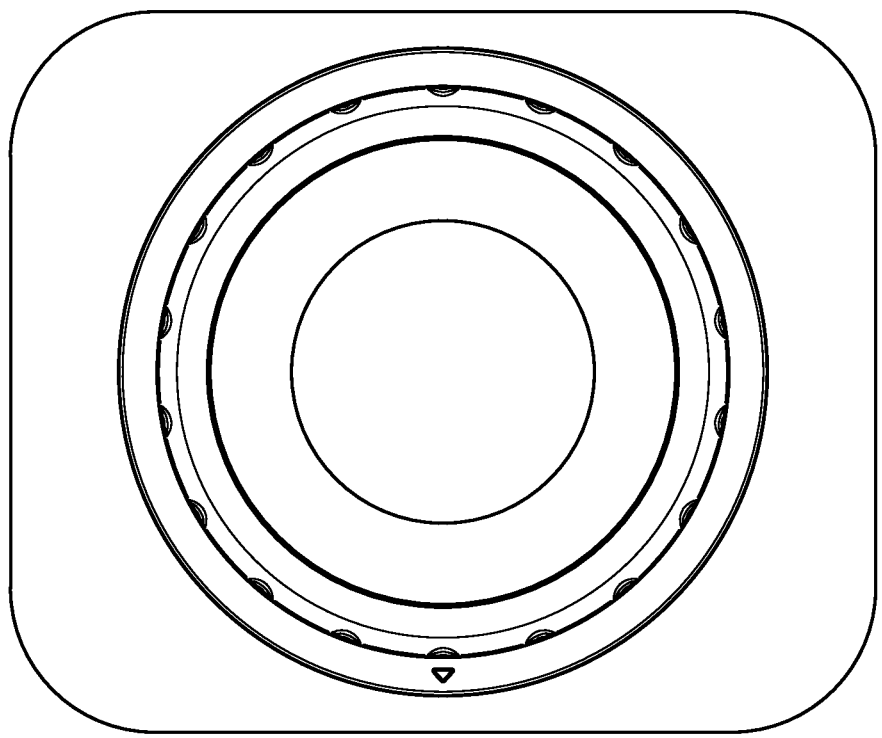
FIG. 6B shows a top plan view of the topside control panel pf FIG. 4.
Figure 6C:
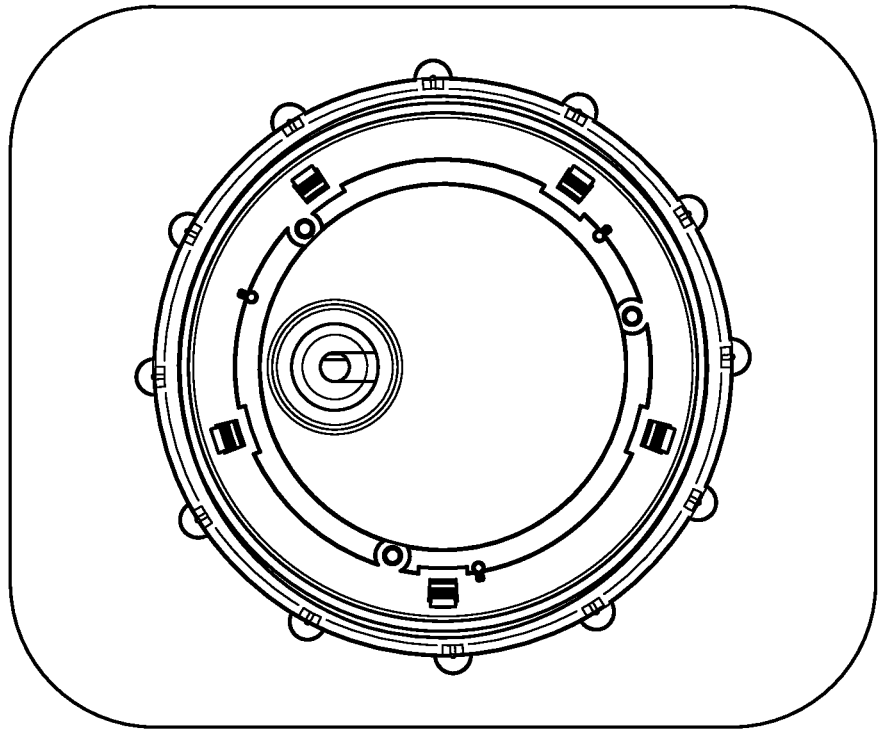
FIG. 6C shows a rear plan view of the topside control panel of FIG. 4 in accordance with a specific practical example of implementation of the present invention.
Figure 6D:
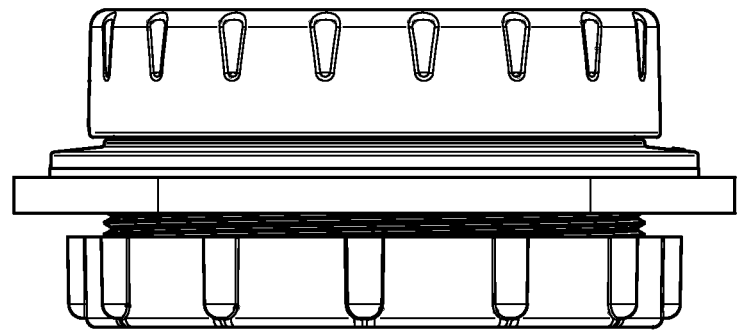
FIGS. 6D and 6E show left side and right side elevational views of the topside control panel of FIG. 4.
Figure 6E:
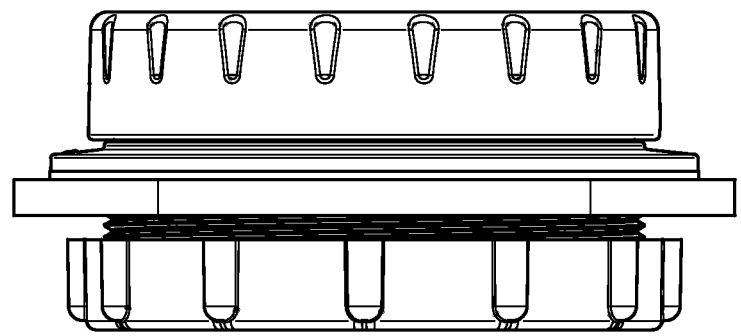

The generally circular housing portion 305 encloses a display assembly 320. As best seen in FIG. 6A, the display assembly 320 includes a display screen 350, analogous to display 33 of FIG. 2. The display screen 350 may be in the form of an LCD display device and is used to render a user interface thereon. The display screen 350 is visible to the user through and is covered by a clear display cover 325 that protects the display screen 350. The display cover 325 may be surrounded by a non-display cover 330 that surrounds the display screen 350, and both the display cover 325 and the non-display cover 330 overlay the display screen 350. In some embodiments, the non-display portion 330 may not be present, and the display cover 325 may make up the entire top surface of the display assembly 320. In some embodiments, the display cover 325 is a protective glass layer or plastic layer. Such a protective layer contributes to the watertightness of the topside control panel 300 and is particularly useful in embodiments in which the display screen 325 does not include touch-screen capabilities.

In the embodiment shown in FIGS. 4, 5, and 6A to 6E, the topside control panel 300 includes the display assembly 320 and a user-operable actuator in the form of a manually operable actuator 310 (analogous to manually operable actuator 32 shown in FIG. 2) that is positioned about a periphery of the generally circular housing 305. While the manually operable actuator 310 shown is a ring-shaped manually operable actuator that encircles the periphery of the generally circular housing portion, in alternate implementations (not shown in the figures), the manually operable actuator may be in the form of a partial arc so that it partially encircles the generally circular housing portion.

Actuation of the topside control panel 300, for example when operated by a user in a push-button like action and or when the manually operable actuator 310 is rotated in a clockwise or counterclockwise direction relative to the display assembly 320, causes a signal to be transmitted to the processor of the circuit board assembly 365 (seen in FIGS. 6A and 8 and analogous to the processing unit 210 of FIGS. 2 and 3) where it is processed in accordance with the program instructions stored in a memory device (e.g., memory device 208 in FIG. 2).

Figure 4:
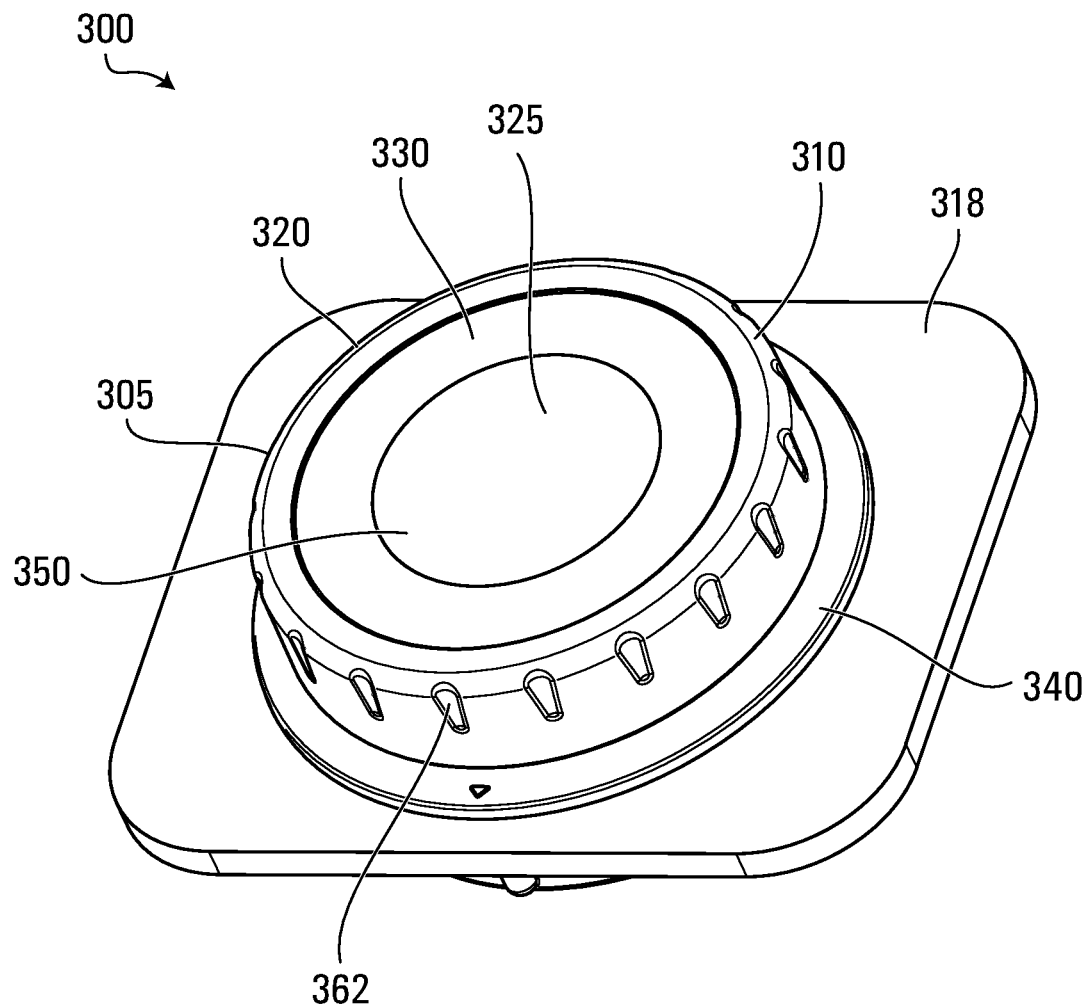
FIG. 4 shows a perspective view of a topside control panel having a housing with a generally circular housing portion and a manually operable actuator positioned about a periphery of the generally circular housing portion in accordance with a practical example of implementation of the present invention.
Figure 5:
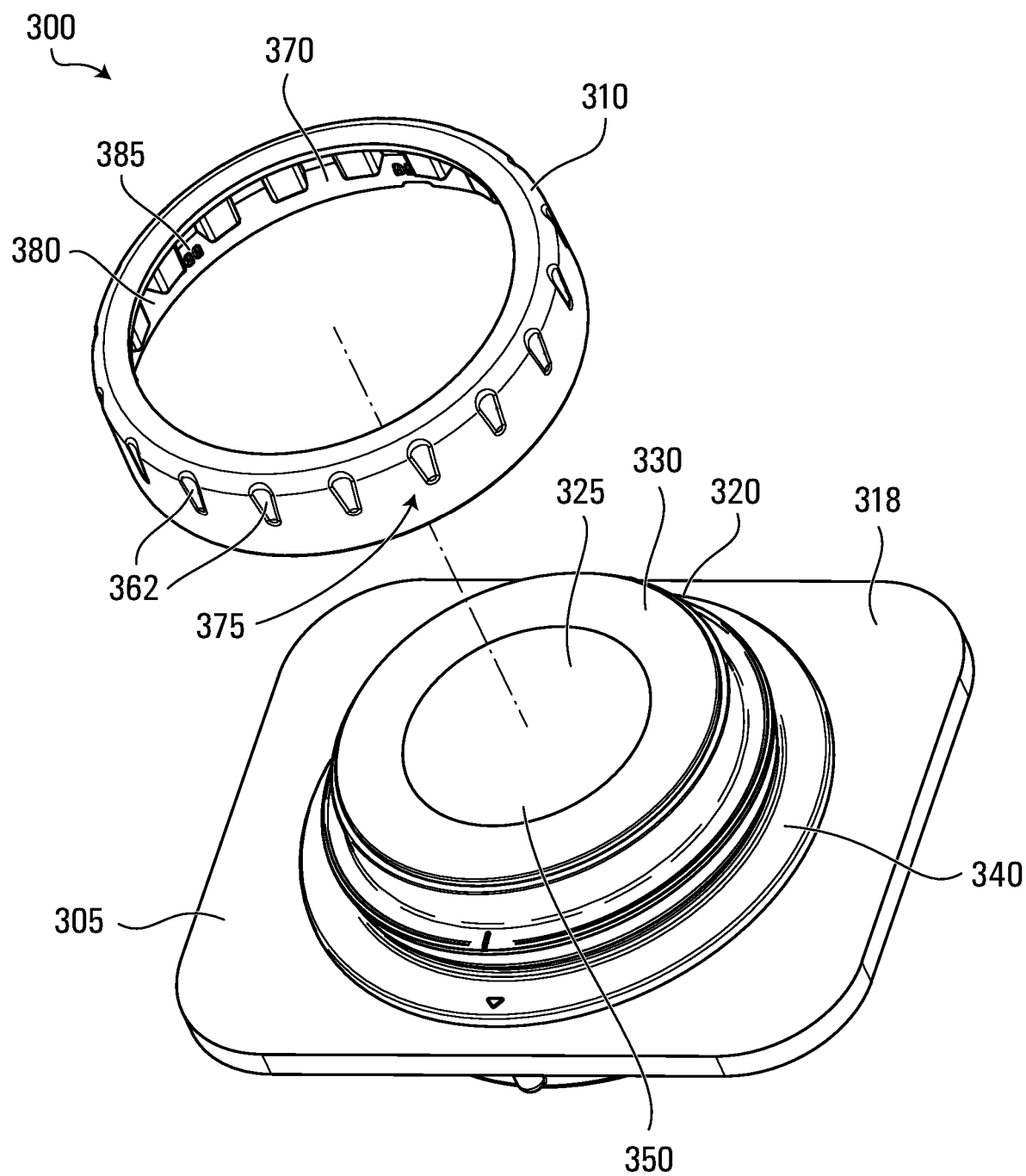
FIG. 5 shows the topside control panel of FIG. 4 with the manually operable actuator shown removed from the housing of the topside control panel in accordance with an example of implementation of the present invention.

As shown in FIGS. 4 and 5, the manually operable actuator 310 is separable from the remainder of the generally circular housing portion 305. That is, the manually operable actuator 310 has a rotational degree of freedom (clockwise and counterclockwise) with respect to the generally circular housing portion 305 such that, in use, the manually operable actuator 310 can be manually rotated to various rotational positions with respect to the display screen 350 located on the generally circular housing portion 305. The manually operable actuator 310 is also shaped to carry out inward displacements between an extended position and an actuated position. These inward displacements are in a direction transverse to the direction of rotation of the actuator wheel.

The manually operable actuator 310 has a generally annular profile and is configured to fit around and surround the display assembly 320. The manually operable actuator 310 may include non-smooth features, such as protrusions and/or indentations, on its inner and/or outer surfaces as will be described later on in the present disclosure.

The manually operable actuator 310 includes an inner periphery 380 that when assembled with the housing is adjacent the periphery of the generally circular housing portion. The inner periphery 380 has non-smooth inner features defining interior magnet pockets 370 arranged at intervals around the inner periphery 380. The manually operable actuator includes an outer periphery 375, which has gripping elements 362 for engaging fingers of the user of the bathing unit system to facilitate rotating the manually operable actuator 310. That is, the gripping elements 362 are meant to allow a user, in particular a user with wet hands, to more easily grasp and turn the manually operable actuator 310. In the embodiment depicted, the gripping elements 362 have been shown as physical indentation/notches on the outer periphery 375 of the manually operable actuator 310, where the indentation/notches form finger gripping elements. It is to be appreciated that, in other embodiments, the gripping elements 362 may not include physical indentation/notches and the outer periphery 375 may be generally smooth and may instead gripping elements 362 in the form of a gripping material (not shown in the figures) applied to the outer periphery 375 of the manually operable actuator 310. Alternatively, still, the gripping elements 362 may include physical indentation/notches as well as a gripping material applied to at least a portion of the outer periphery 375 of the manually operable actuator 310. Materials, such as rubber polyurethane, polyethylene and some grades of plastics (polycarbonate, etc.), which tend to have a higher coefficient of friction, may be used in connection with such gripping elements.

FIG. 5 shows a partially exploded perspective view of the topside control panel 300 of FIG. 4 with the manually operable actuator 310 shown removed from the housing of the topside control panel 300.

In some implementations, the inner periphery 380 of the manually operable actuator 310 can also include various clips 385 that rotatably attach the manually operable actuator 310 to the display assembly 320. The clips 385 serve to allow the manually operable actuator 310 to engage and disengage from the periphery of the circular housing in response to a pulling force applied to the manually operable actuator 310 that is oriented away from the housing. By configuring the topside control panel 300 so that the manually operable actuator 310 can disengage the housing using a pulling force simplifies access to the periphery of the housing 305 to allow for cleaning, installation and/or maintenance of the topside control panel 300. This configuration also allows for swapping the manually operable actuator 310 with another in a case where the manually operable actuator breaks 310 and/or if a user wishes to install a manually operable actuator having a different design.

Figure 7:
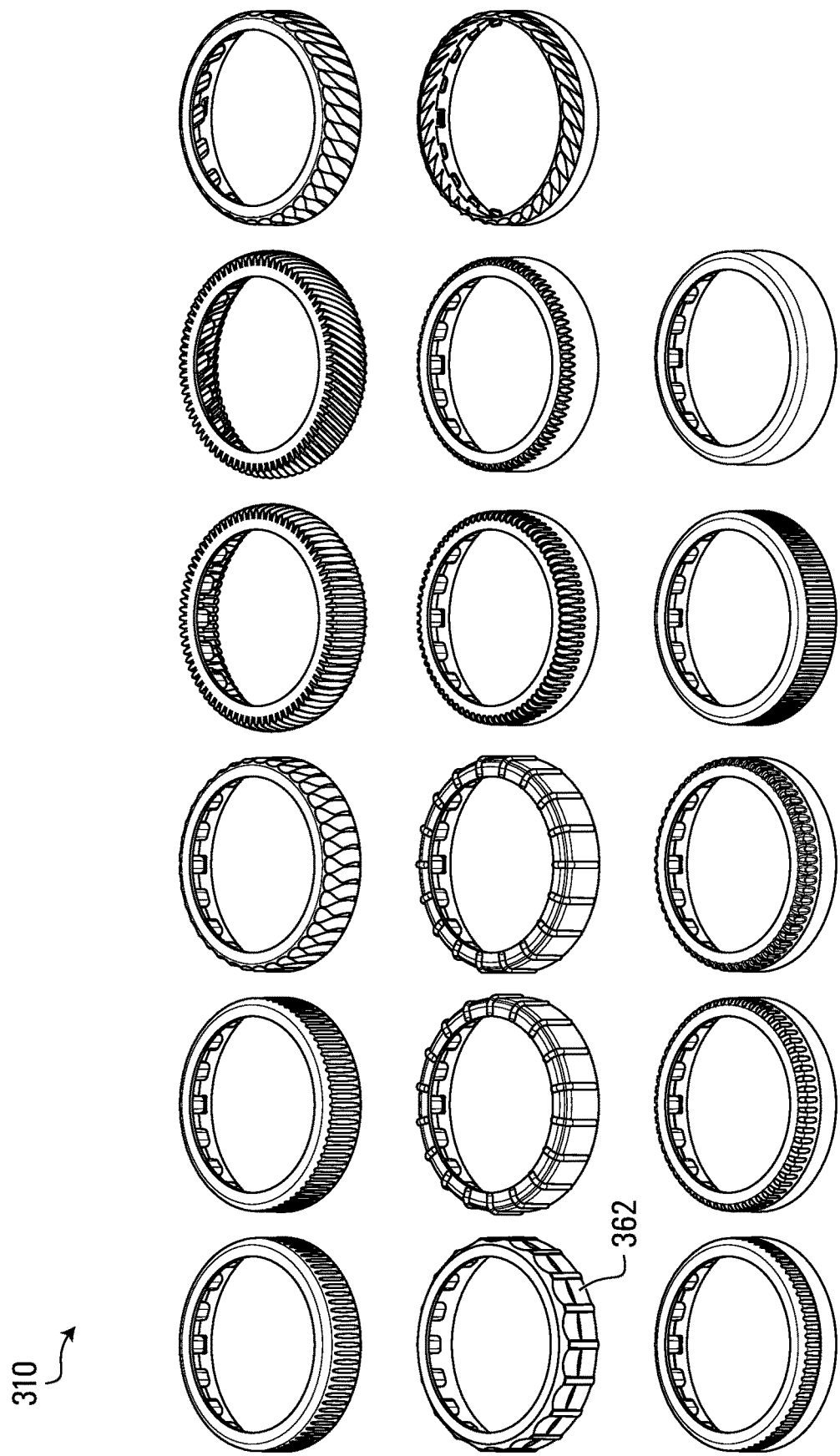
FIG. 7 shows different examples of alternate practical embodiments for the manually operable actuator of the topside control panel of FIG. 4.

FIG. 7 shows specific examples of manually operable actuators with different configuration of physical gripping elements about the outer periphery of the manually operable actuator 310. Each of the embodiments illustrates different configurations that cooperate with the housing 305 and that facilitate manipulation of the manually operable actuator 310 by a user of the bathing unit system.

As illustrated, the gripping elements 362 on the outer periphery 375 can be divots, indentations, or other concave features on the outer periphery 375 of the manually operable actuator 310. Alternatively, the gripping elements 362 can be protrusions or otherwise convex features on the outer periphery 375. In some embodiments, both concave and convex features can be combined on the outer periphery 375 manually operable actuator 310. For example, the gripping elements 362 can be formed by knurling the outer periphery 375. In some embodiments, the gripping elements 362 can extend the entire height of the lateral surface of the manually operable actuator 310. In some embodiments, the gripping elements 362 extend only part way from the upper surface of the manually operable actuator 310. In some embodiments, the gripping elements 362 can also be partially located on an upper surface of the manually operable actuator 310. The gripping elements 362 can include a plurality of interleaved indentations and protrusions positioned about the outer periphery 375 of the manually operable actuator 310 and may be shaped to generally conform to the shape of fingers. In some embodiments, the gripping elements 362 may be made at least in part of a gripping material applied to at least a portion of the outer periphery 375 of the manually operable actuator 310 (e.g., rubber, polyurethane, polyethylene and some grades of plastics (polycarbonate, etc.).

In some embodiments, the outer periphery 375 of the ring-shaped manually operable actuator 310 may have a straight (e.g., linear) profile, whereas in some embodiments the outer surface has a curvature, e.g., an outwards or inwards curvature.

Figure 8:
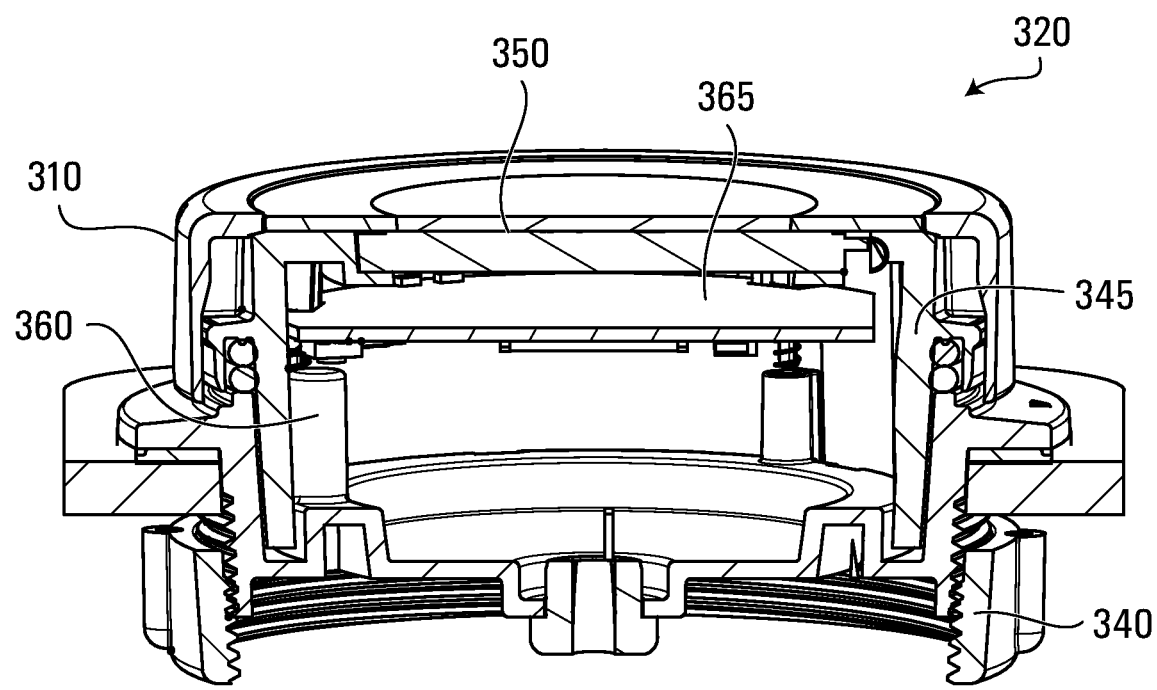
FIGS. 8 and 9 show cross sectional elevated views of portions of the topside control panel of FIG. 4 in accordance with a specific practical example of implementation of the present invention.
Figure 9:
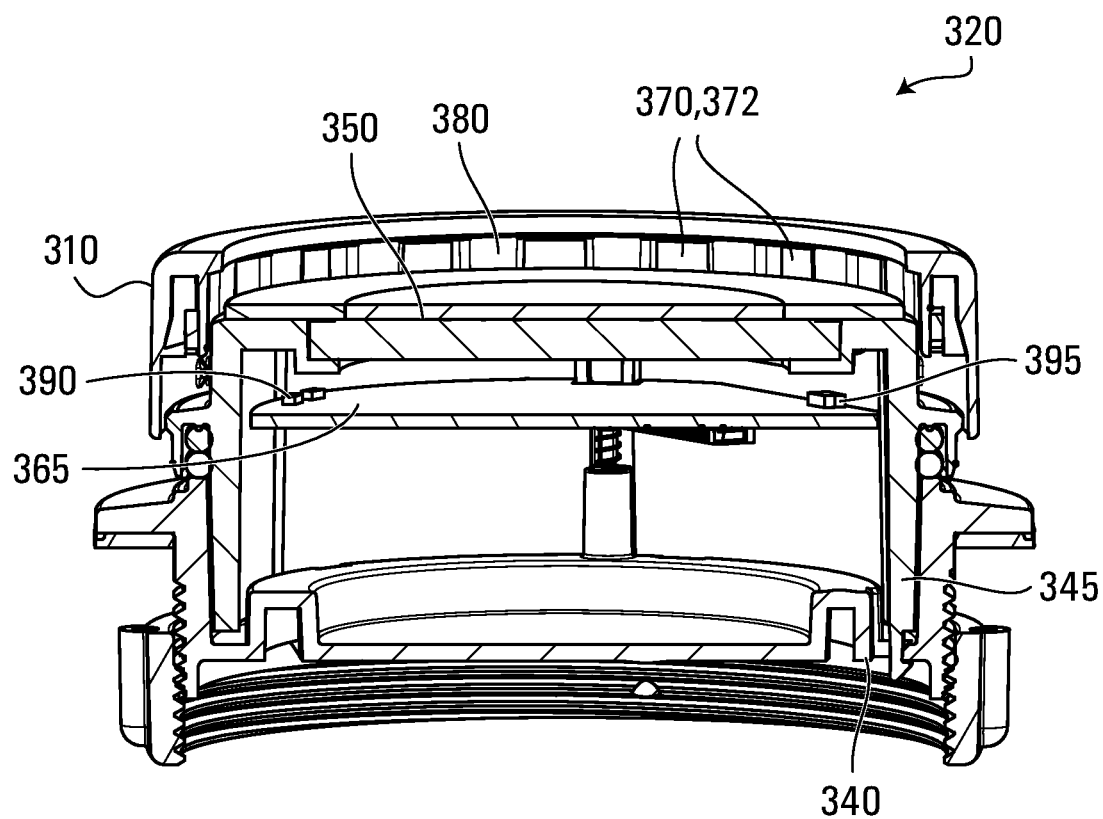

FIGS. 8 and 9 show cross sectional elevated views of portions of the topside control panel of FIG. 4. As shown in FIG. 8, the topside control panel 300 includes a circuit board assembly 365 positioned in the housing beneath the display screen 350, which is electrically coupled thereto. The circuit board assembly 365 is analogous to the processor assembly 206 of FIG. 2 and includes a memory device, analogous to memory device 208 and a processing unit, analogous to processing unit 210. The memory device may store various information, including a set of pump settings, and program instructions for allowing the topside control panel 300 to implement various functions of the type described above with reference to FIG. 2. The circuit board assembly 365 is also configured to control the display screen 350 to render a user interface thereon.

The base 340 of the topside control panel 300 also includes one or more mechanical posts 360 positioned in the upper portion 345 of the housing 305 and aligned with actuator buttons located beneath on the display assembly 320 and electrically and functionally coupled to the circuit board assembly 365. The functionality provided by the one or more mechanical actuator buttons 360 in conjunction with other elements of the topside control panel 300 will be described in the next section.

Functionality of the Topside Control Panel 300 Including User Inputs to and Feedback from the Topside Control Panel 300

The circuit board assembly 365 positioned in the housing 350 is operatively coupled to the display screen 350, the manually operable actuator 310, and the one or more mechanical actuator buttons 360. The circuit board assembly 365 includes one or more processors that are programmed for accepting inputs made at the topside control panel 300 input by the user via manual manipulation of the manually operable actuator 310 and for either altering the display shown on the display screen 350 accordingly and/or for issuing control signals to the bathing unit controller 34 (shown in FIG. 1). This function includes rendering on the display screen 350 a multi-layer menu driven interface presenting user-selectable options for controlling at least some water features of the bathing unit system, (e.g., pump speed of one or more pumps, number of pumps operating, water temperature, light settings, massage patterns, pumping patterns (including frequency and/or intensity), swim-spa patterns etc.). At least one specific menu layer of the multi-layer menu driven interface presents options for controlling the one or more pumps. Additionally, the functions controlled by the circuit board assembly 365 includes permitting navigation through the multi-layer menu driven interface by using signals triggered by a combination of rotations received at the manually operable actuator 310 and inward displacements of the manually operable actuator 310 to select specific user-selectable options to arrive at the specific menu layer presenting options for controlling the one or more pumps.

When assembled in as part of the topside control panel 300, the manually operable actuator 310 and the display assembly 320 are coupled together along with the upper portion 345 of the housing 305 (and in some embodiments, the circuit board assembly 365). In a specific implementation, the manually operable actuator 310 and the display assembly 320 are configured to move together in the inward direction so that an inward displacement of either one is associated with a corresponding inward displacement of the other.

Referring to FIG. 8, a user provides an activation command to the topside control panel 300 by inwardly displacing the manually operable actuator 310 by, for example, applying a force oriented towards the housing in a direction transverse to a direction of rotation of the manually operable actuator 310, the force being applied to the manually operable actuator 310 and/or to the display assembly 320. Sufficiently displacing the manually operable actuator 310 and/or the display assembly 320 causes the pressed component(s) and the attached components to displace axially downwards as a unit, and thereby exert a force on the one or more mechanical actuator buttons 360 attached to the base 340. If the user presses the manually operable actuator 310 with sufficient force so as to engage the mechanical actuator button 360 and then releases it, the circuit board assembly 365 receives a signal from the depressed mechanical actuator button 360 indicating that the manually operable actuator 310 has moved from its extended position towards the actuated position and has reverted to the extended position absent the applied force. This is registered as a selection or activation input by the user to the topside control panel 300.

In some embodiments, the mechanical actuator button 360 is a physically compressible button that can be depressed by force being applied to it. That is, the user pressing and releasing the manually operable actuator 310 and/or the display assembly 320 causes the mechanical actuator button 360 to be compressed and then released. In other embodiments, the actuator button 360 is not movable, but is a solid component such as a plastic post. A component on the display assembly 320, or on the circuit board assembly 365 may instead be activated when a contact is established with the mechanical actuator button 360.

Referring to FIG. 9, the manually operable actuator 310 is shown partially removed from the display assembly 320 so that the inner periphery 380 of the manually operable actuator 310 is visible. A series of wheel magnets 372 are positioned in the interior magnet pockets 370 and are radially arranged around the inner periphery 380 of the manually operable actuator 310. One or more Hall sensors 390 are positioned on an outer edge of the circuit board assembly 365. When a user imparts a rotational displacement to the manually operable actuator 310 by grasping and rotating the manually operable actuator 310 in a clockwise or counterclockwise direction with respect to the display assembly 320, the series of wheel magnets 372 and the one or more Hall sensors 390 cooperate to trigger signals conveys the rotational displacement of the manually operable actuator 310 to the processors of the circuit board assembly 365.

Figure 10:
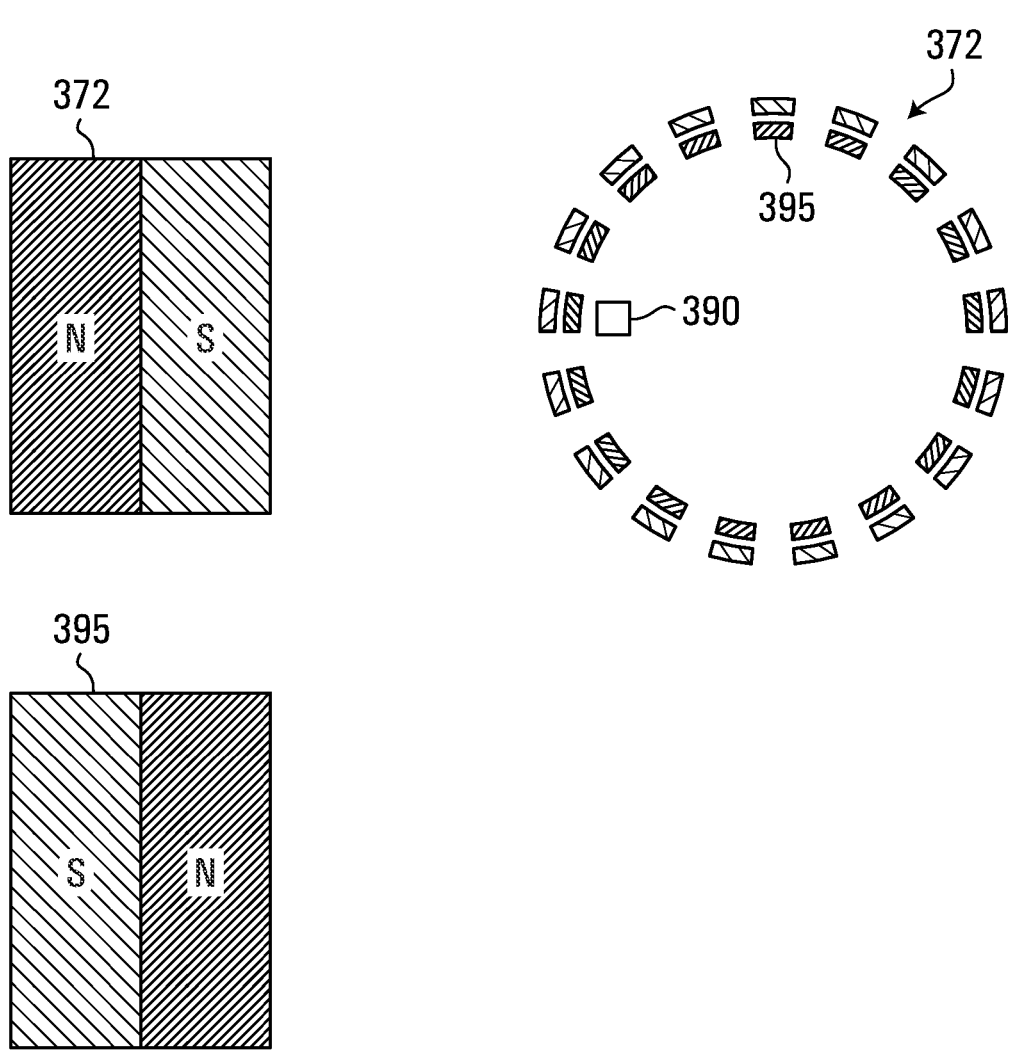
FIG. 10 illustrates magnetic elements and/or sensor configurations used in connection with the topside control panel of FIG. 4 in accordance with a specific practical example of implementation of the present invention.

Referring to FIG. 10, the wheel magnets 372, like all magnets, are polarized to have a north pole and a south pole. To coordinate with the Hall sensors 390, the wheel magnets are oriented such that they fit within their respective interior magnet pockets 370 with like poles (either north or south) directed in the same radial direction, e.g., with south poles facing outward and north poles facing inwards. The Hall sensors 390 are positioned near the edge of the circuit board assembly 365 so that they come into relatively close contact with the wheel magnets 372 (e.g., within 10 mm, preferably within 5 mm) in such a manner as to be able to detect and generates signals conveying changes in the magnetic effects caused by the set of wheel magnets 372 as the manually operable actuator 310 is rotated. Any suitable method known in the art may be used in connection with the Hall sensors 390 to detect the amount and rotation direction of the wheel magnets 372 as they pass within sensing distance of the respective Hall sensor 390. These signals are interpreted the processors of the circuit board assembly 365 to determine the position and rotational direction of the manually operable actuator 310 as it is rotated by the user.

In specific practical implementations, the topside control panel 300 may be configured to impart tactile effects on the manually operable actuator 310 as the manually operable actuator 300 is rotated about the generally circular housing portion.

More specifically, the wheel magnets 372 positioned on an inner periphery of the manually operable actuator 300 are a first set of magnets 372. As shown in FIGS. 9 and 10, a second set of magnets 395 is arranged about an outer periphery of the generally circular housing portion, for example on an outer edge of the circuit board assembly 365 or at another suitable location in the housing of the topside control panel 300. The second set of magnets 395 is positioned so as to coordinate with the first set of magnets 372. As discussed above with respect to FIG. 10, the magnets in the first set of magnets 372 are oriented with their poles directed in the same radial direction (e.g., with south poles facing outward and north poles facing inwards); the magnets in the second set of magnets 395 are positioned in an opposite polarity to the magnets in the first set of magnets 372. For example, if the magnets in the first set of magnets 372 are oriented with their south poles facing outward and north poles facing inwards the magnets in the second set of magnets 395 are oriented with their north poles facing outward and south poles facing inwards. The magnets in the second set of magnets 395 are positioned along the edge of the housing so that they come into relatively close contact with the magnets in the first set of magnets 372 (e.g., within 10 mm, preferably within 5 mm) when the manually operable actuator 310 is assembled to the housing 305. The magnets in the second set of magnets 395 are stationary relative to the manually operable actuator 310 as the manually operable actuator 310 rotated. Thus, as the manually operable actuator 310 is rotated about the housing 305, the magnetic fields created by the sets of opposing magnets in the first 372 and second 395 sets are configured for causing a temporary resistance and then a release, which in turn imparts a tactile effect to the manually operable actuator 310. In particular, as the manually operable actuator 310 is rotated, respective ones of the magnets in the first set 372 come into proximity to the magnets in the second set 395. The opposite poles of the respective magnets 372 and 395 attract the two magnets to each other. As the user continues to turn the manually operable actuator 310, a certain amount of force is required to pull the two attracted magnets apart and then a new attractive magnetic force is felt as the subsequent magnet in the first set of magnets 372 is brought into range of the stationary magnets in the second set of magnets 395. This repeated increase and reduction in force due to the magnetic attraction between the mobile magnets in the first set 372 and the stationary magnets in the second set 395 causes the user to feel a tactile effect indicating rotation of the manually operable actuator 310.

Preferably the tactile effect is associated to corresponding adaptations of information presented on the user interface on the display screen 350 and serves to give tactile feedback to the users as they navigate through the multi-layer menu driven interface.

In practical implementations, the magnets in the first and seconds sets 372 and 395 may be arranged in different suitable manners and different numbers of magnets may be included in each set. In some specific implementation, the magnets in the first set 372 may be arranged at first regular intervals about the inner periphery of the ring-shaped manually operable actuator 310 and the magnets in the second set 395 may be arranged at second regular intervals about the outer periphery of the generally circular housing portion. In some implementation, the first regular intervals may be matched to the second regular intervals so that, in a rest position, there is alignment between the magnets in each set however other implementations may choose different intervals the first and second sets 372 and 395. In addition, while in some implementations the number of magnets in the first and second sets 372 and 395 may be the same, other implementations may use different numbers of magnets in each set depending on the tactile effect that is desirable to achieve.

Other mechanisms for imparting tactile effects to the manually operable actuator 210 and/or housing may be used in alternate implementation. Such mechanisms may include without being limited to suitable components for imparting haptic feedback of the type known in the art. Such mechanisms are beyond the scope of the present disclosure and will not be described further here.

Functionality of the Topside Control Panel 300

Some examples of the functionality that may be implemented by topside control panel 300 will now be described with reference to FIGS. 11A, 11B and 12A to 12E in order to illustrate some of the concepts described earlier in the present disclosure.

In a specific implementation, the effect of the signal transmitted to the processor of the circuit board assembly 365 when the manually operable actuator 310 is operated by a user in a push-button like action and/or a rotational action may depend upon the operational mode in which the bathing unit system 100 is currently operating and/or on the information displayed on the display screen 350.

Figure 11A:
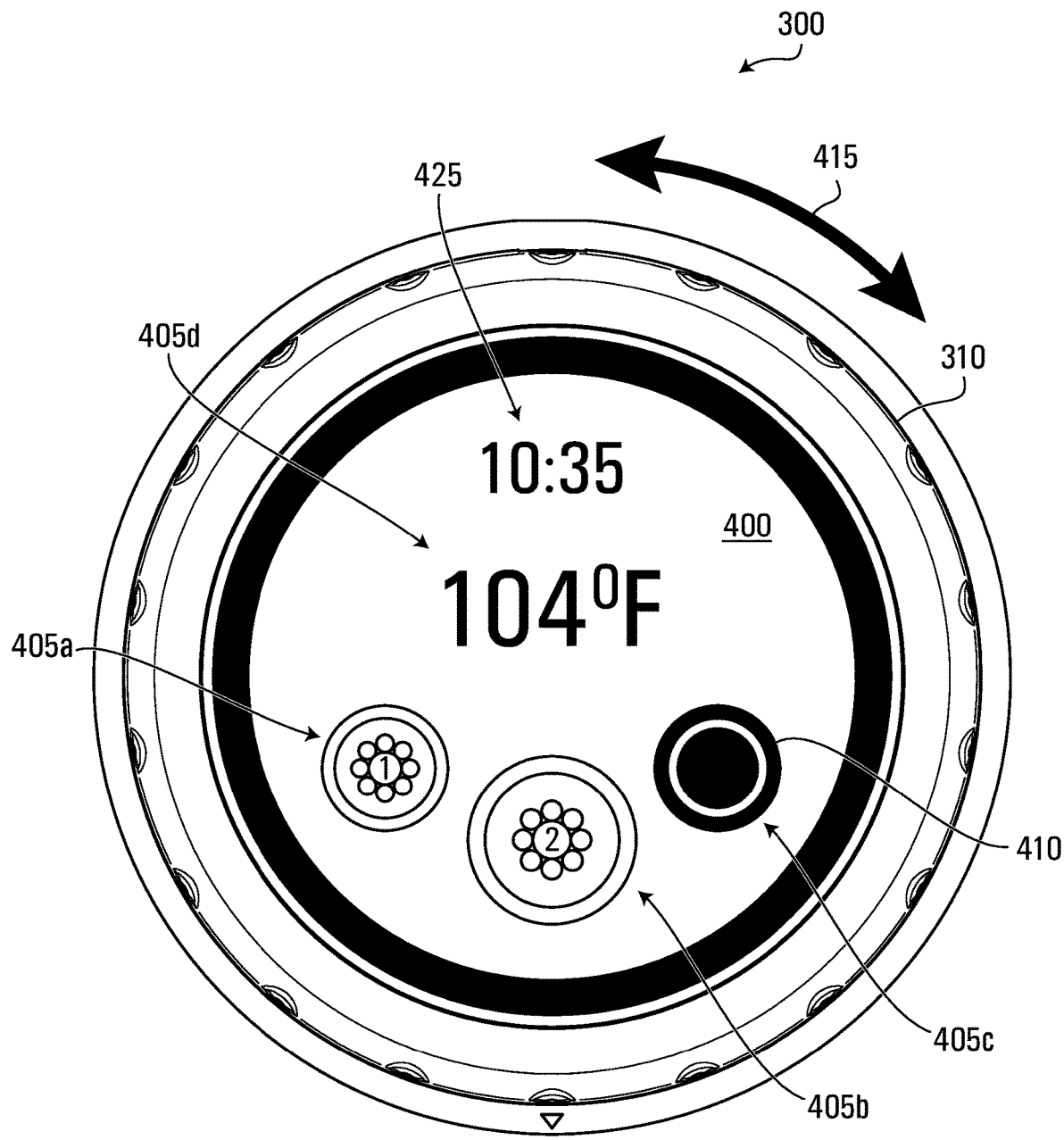
FIGS. 11A and 11B illustrate examples of specific menu layers of a multi-layer menu driven interfaces that may be presented on a display screen of the topside control panel of FIG. 4 in accordance with specific practical examples of implementation of the present invention.

FIG. 11A shows a specific menu layer 400 that may be rendered on the display screen 350 of the manually operable actuator 310. The specific menu layer 400 is part of a multi-layer menu interface presenting user-selectable options for controlling at least some water features of the bathing unit system, the user-selectable options corresponding to the icons 405a . . . d shown on the display. The displayed icons 405a . . . d may include selectable icons that the user can select by performing a combination of rotations and inward displacements of the manually operable actuator 310 in order to make changes to the spa functions. The icons may correspond to various components of the bathing unit system, for example, the pumps such as icons 405a 405b and 405c, or for controlling comfort parameters, for example temperature settings, such as icon 405d. Selector element 410 is positioned on the icon corresponding to a third pump in the spa system 100 to indicate that the icon 405c corresponding to the third pump is currently selected. The specific menu layer 400 can also show status information, including status associated with components of the bathing unit system. For example, icon 425 in the specific menu layer 400 conveys the time.

Interaction with the topside control panel 300 allows a series of specific menu layers, such as specific menu layer 400, to be displayed. Navigation through the multi-layer menu driven interface occurs by using signals triggered by a combination of rotations and inward displacements of the manually operable actuator 310 to select specific user-selectable options. A specific combination of rotations and inward displacements of the manually operable actuator 310 allows a user to arrive at the specific menu layer 400 presenting options for controlling one or more pumps, in the example depicted the three pumps corresponding to icons 405a 405b and 405c.

For example, rotating the manually operable actuator 310, in the manner shown by the arrow 415 in FIG. 11A, allows the user to sequentially position selector element 410 on a specific one of the icons 405a . . . d, the selected icon. In the example shown, the manually operable actuator 310 was rotated until the selector element 410 was positioned on icon 405c corresponding to the third pump. Pressing on the manually operable actuator 310 causes an inward displacement of the manually operable actuator 310 between the extended position and the actuated position. When the inward displacement is performed with the selector element 410 positioned on icons 405c, the third pump is selected as the active component and is then ready to receive commands. A second inward displacement of the manually operable actuator 310 may cause the currently active component, in this case the third pump, to be deselected so that it no longer accepts commands and maintains its current operational setting. In some implementations, certain pressing patterns (or sequences) and/or different pressing durations manually operable actuator 310 will result in different types of command signals being generated to control the bathing unit components in a specific manner. For example, two consecutive inward displacements of the manually operable actuator 310 may send signals causing the third pump to toggle from an ON and an OFF position, or vice versa.

In a specific implementation, while the third pump 405c remains selected as the active component, rotation of the manually operable actuator 310 modifies the current speed of operation of that pump. For instance, in response to signals conveying a rotation of the manually operable actuator 310 in a clockwise direction, the current speed of operation of the third pump may be increased while in response to a rotation of the manually operable actuator in a counterclockwise direction, the current speed of operation of the third pump may be decreased.

In an alternative implementation, rather than controlling the speed of a pump by a rotation of the manually operable actuator 310, the speed of a given pump may be set based on a sequence of inward displacements of the manually operable actuator 310. In some embodiments, the topside control panel 300 may be configured to control pumps that have a set of two or more discrete possible speeds. When the set of discrete possible speeds includes two speeds, the pumps are typically referred to as dual speed pumps. In such a situation, the options presented on the specific menu layer may be configured for permitting control of the pump speed in response to the manually operable actuator 310 being repeatedly pressed and released such that the controller cycles through the set of discrete possible speeds at which the pumps can operate.

In some embodiments, the topside control panel 300 controls pump features in addition to pump speed. For example, the options presented for controlling the one or more pumps can include a set of pumping patterns available for selection. Rotations of the manually operable actuator 310 can select a specific pumping pattern from a set of pumping patterns and pressing the manually operable actuator 310 can activate the pump(s) to implement the specific pumping pattern.

Figure 11B:
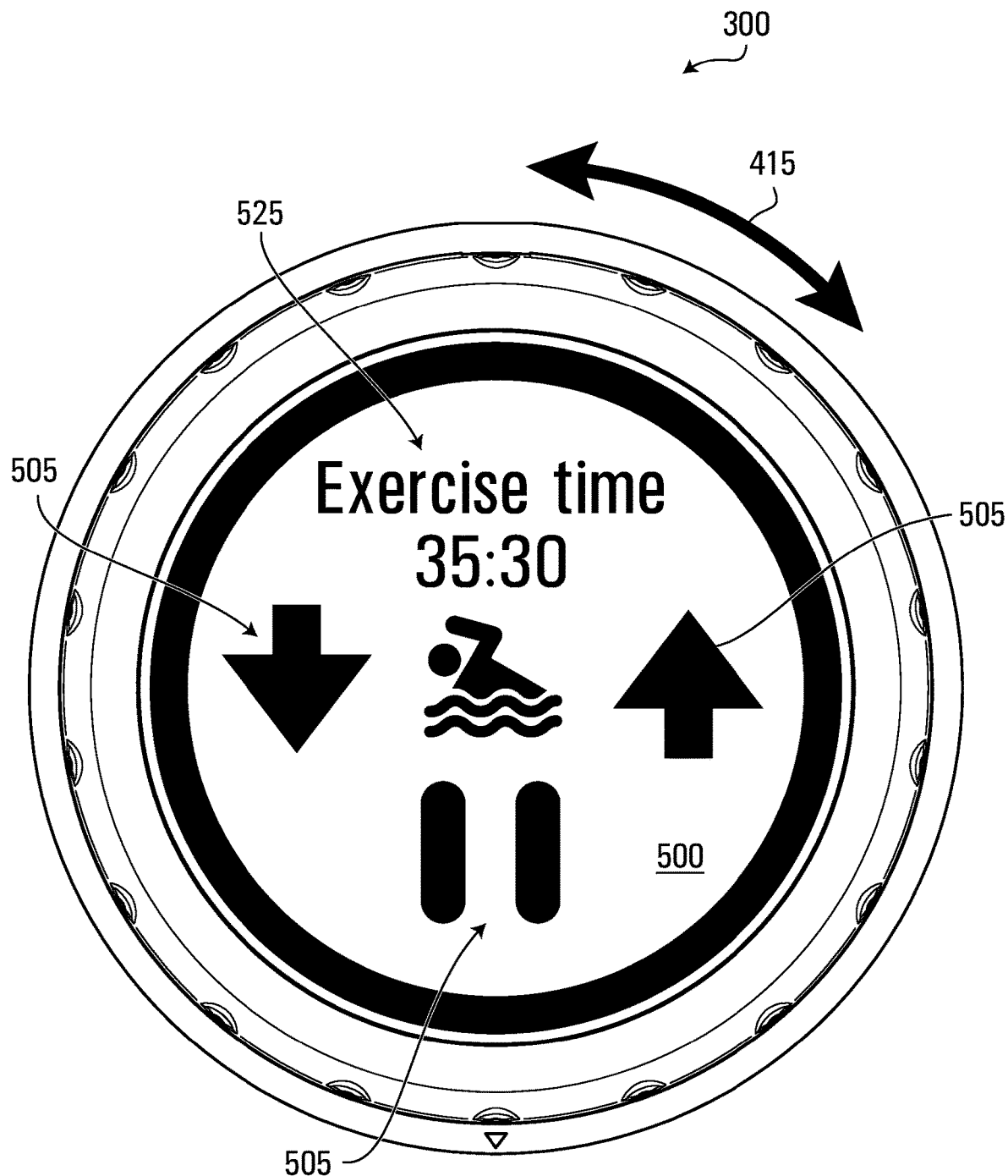

FIG. 11B shows another specific menu layer 500 that may be rendered on the display screen 350 of the manually operable actuator 31. The specific menu layer 500 is part of a multi-layer menu interface presenting user-selectable options for controlling at least some water features of the bathing unit system. In this specific example, the specific menu layer 500 pertains to the control of swim-spa functions. For such a system, the pump(s) 13 and jets 20 (as shown in FIG. 1) are arranged to direct a flow of water in at least one constant direction within the tub 18 so that the user can swim in place. For such a system, the topside control panel 300 may be preferably located such that the swimmer can easily access it while in the tub.

In the example depicted in FIG. 11B, a status icon 525 is provided to convey status information, such as a time duration for the swimming program and/or time remaining in the swimming program. Additional icons 505 may also be displayed and may include one or more selectable icons that the user can select by performing a combination of rotations and inward displacements of the manually operable actuator 310 in order to make changes to the swim-spa functions. In a specific example, two options are made available to the user through the user interface. A first option, made available by turning the manually operable actuator 310 in a clockwise (or counterclockwise) direction as represented by the arrow 415 increases (or decreases) the intensity of the water flow, for example by increasing (decreasing) the speed of operation of one or more of the pumps and/or by increasing (decreasing) the number of pumps that are activated in the bathing unit. A second option, made available by pushing on the manually operable actuator 310, may trigger a signal causing some or all the pumps involved in creating a directed flow of water to toggle between an OFF and an ON status, so that the swimmer can either pause or resume a swimming program in progress. Such a reduced number of options may be particularly advantageous as it reduces the complexity of control option which with an active swimmer is confronted during a swim by limiting them to a simplified combination of rotations and pressing actions.

As mentioned above, FIGS. 11A and 11B show examples of menu layers that may be presented on the display of topside control panel 300 in very specific non-limiting examples of implementation. The specific menu layers 400 and 500 are part of a multi-layer menu interface including a plurality of menu layers that may be accessed and operated through various combinations of rotations and inward displacements of the manually operable actuator 310.

FIGS. 12A to 12E depict different layers of a multi-layer menu driven interface of the type that may be present on the display screen 350 in accordance with another specific example of implementation. The combination of layers shown in FIGS. 12A to 12E is shown for the purpose of illustration and it is to be appreciated that different layers and/or layer combinations may for part of the multi-layer menu driven interface in different practical implementations of the topside control panel. As shown, the user can navigate through layers 12A to 12E of the multi-layer menu driven interface by using signals triggered by a combination of rotations and inward displacements of the manually operable actuator 310. As describe earlier in the present document, the different layers of the multi-layer menu driven interface and/or the specific options made available for selection may be customized based on one or more criteria including but not limited to, timing information, user identification information and weather condition (e.g. ambient temperature measurements).

Figure 12A:
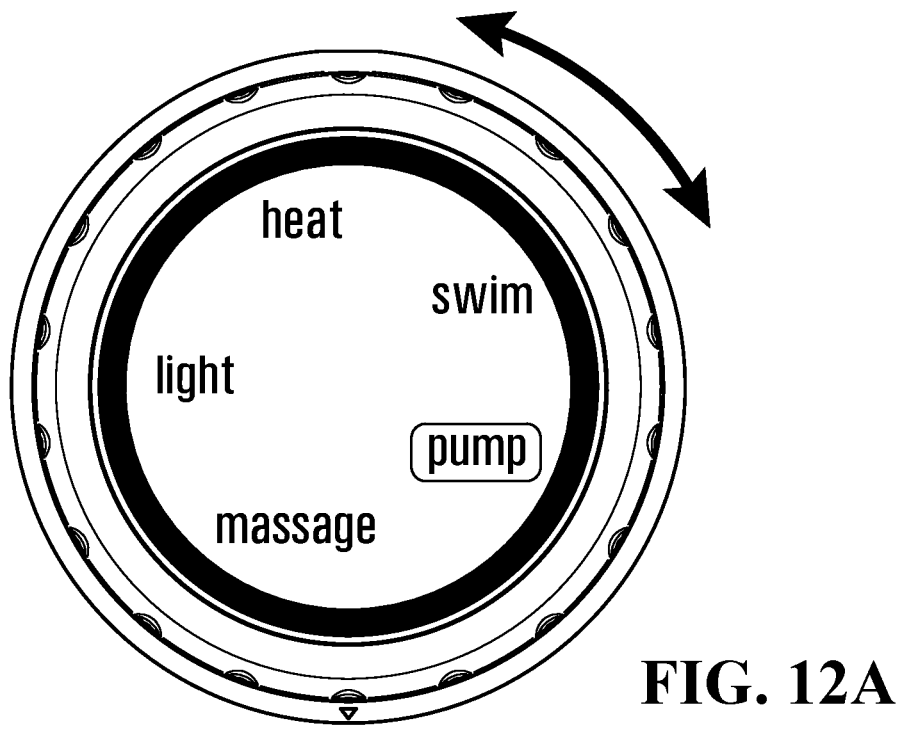
FIGS. 12A to 12E show other menu layers of a multi-layer menu driven interface of the type that may be rendered on the display screen of the topside control panel of FIG. 4 in accordance with very specific examples of implementation of the invention.
Figure 12B:
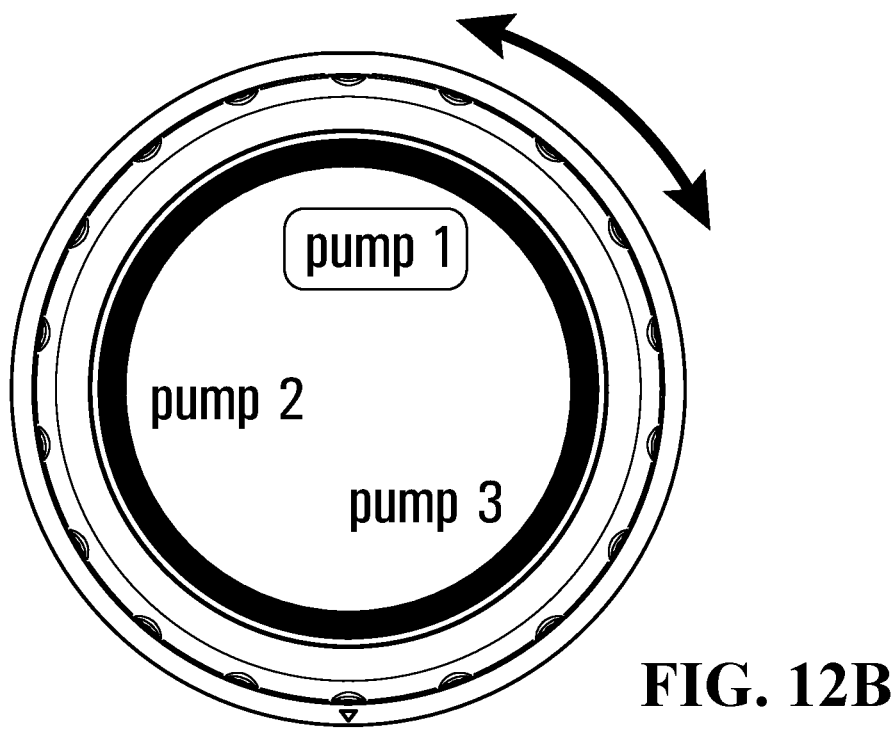
Figure 12C:
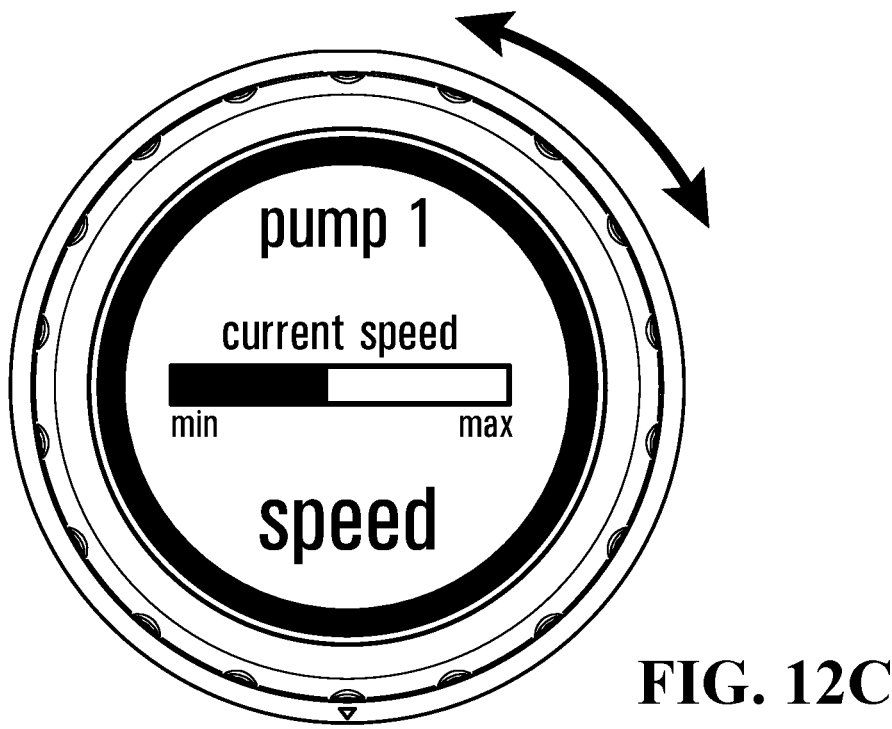

In the example depicted, FIG. 12A depicts a first specific menu layer presenting options for selection amongst different components of the bathing unit system and/or for selecting massage patterns. A rotation of the manually operable actuator 310 so that a selector element is aligned with "pump" and an inward displacement manually operable actuator 310 may cause a second specific menu layer, of the type depicted in FIG. 12B to be displayed, in which a pump control menu layer may be presented enabling a user to select a specific pump amongst different pumps to control. A rotation of the manually operable actuator 310 so that a selector element is aligned with "pump 1" and an inward displacement manually operable actuator 310 may cause a third specific menu layer, of the type depicted in FIG. 12C to be displayed. In this specific example, rotation of the manually operable actuator 310 in a clockwise (counter clock wise) direction increases (decreases) the speed of the pump and a certain sequence of pressing actions (for e.g. but without being limited to: one inward displacement, two consecutive inward displacements and/or an inward displacement maintained for a prolonged duration (say >5 seconds)) may cause the speed to either be set, the pump to be turned "OFF" and/or the user interface to return to the second menu layer (shown in FIG. 12B).

In some embodiments, rather than controlling the speed of operation of the one or more pump, the topside control panel 300 may be configured to control the operations of the pumps in different manners. For example, the options presented for controlling the one or more pumps can present a set of user selectable options conveying a set of pumping patterns available for selection. Pumping patterns typically include patterns in which the pumping speed is varied over time according to a certain sequence, wherein optionally the intensity and/or frequency of the sequence may further be independently controlled by the user through the topside control panel 300.

Figure 12D:
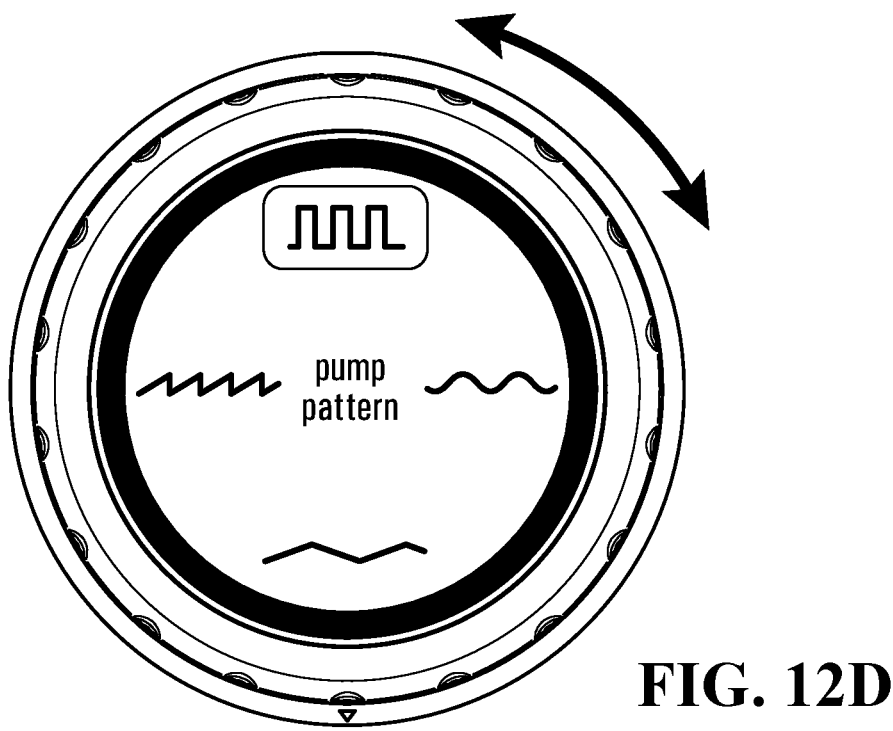
Figure 12E:
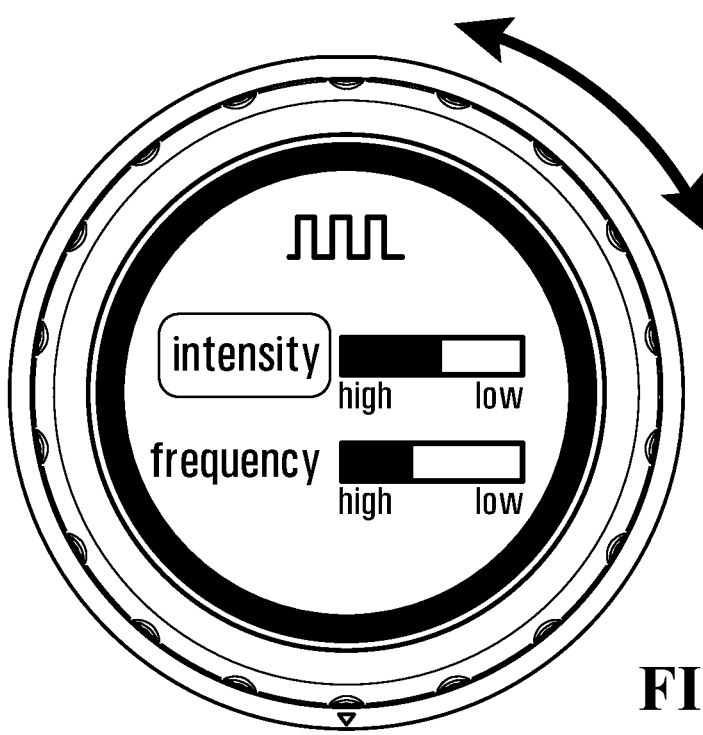

Returning to FIG. 12A, rotation of the manually operable actuator 310 so that a selector element is aligned with "Pumping pattern" and an inward displacement manually operable actuator 310 may cause a fourth specific menu layer, of the type depicted in FIG. 12D to be displayed, in which a menu layer may be presented enabling a user to select a specific pumping patterns amongst different pumping patterns. In the example depicted, four distinct pumping patterns are made available for selection however any number of pumping patterns may be made available for selection. As describe earlier in the present document, the specific pumping patterns made available for selection may optionally be customized based on one or more criteria including but not limited to, timing information, user identification information and weather condition (e.g. ambient temperature measurements).

Rotation of the manually operable actuator 310 can be used to select a specific pumping pattern from a set of pumping patterns and pressing the manually operable actuator 310 can trigger a signal for causing the pump(s) to operate in accordance with the specific selected pumping pattern. Optionally, in response to selection of the specific pumping pattern, the topside control panel 300 may be configured to present a new menu layer on the display presenting the user with options for controlling the pump's intensity and/or frequency, for example of the type depicted in FIG. 12E. As depicted, the user interface includes user selectable options allowing the user to select either intensity or frequency by rotating the manually operable actuator 310 to position a selector element on one of the user selectable options. Depending on which of the intensity or frequency was selected, rotating the manually operable actuator 310 in a clockwise direction increases a selected one of the intensity and the frequency associated with the specific pumping pattern while rotating the manually operable actuator in a counterclockwise direction decreases the selected one of the intensity and the frequency associated with the specific pumping pattern.

Installation of Control Panel in a Bathing Unit System

As mentioned above, the topside control panel 35 described above is for use in connection with bathing unit systems in order to facilitate the control of such systems.

In a typical installation, the topside control panel 35 (including the embodiments depicted in FIGS. 4 to 6E for example), may be mounted to a surface of a tub of a bathing unit system.

Figure 13:
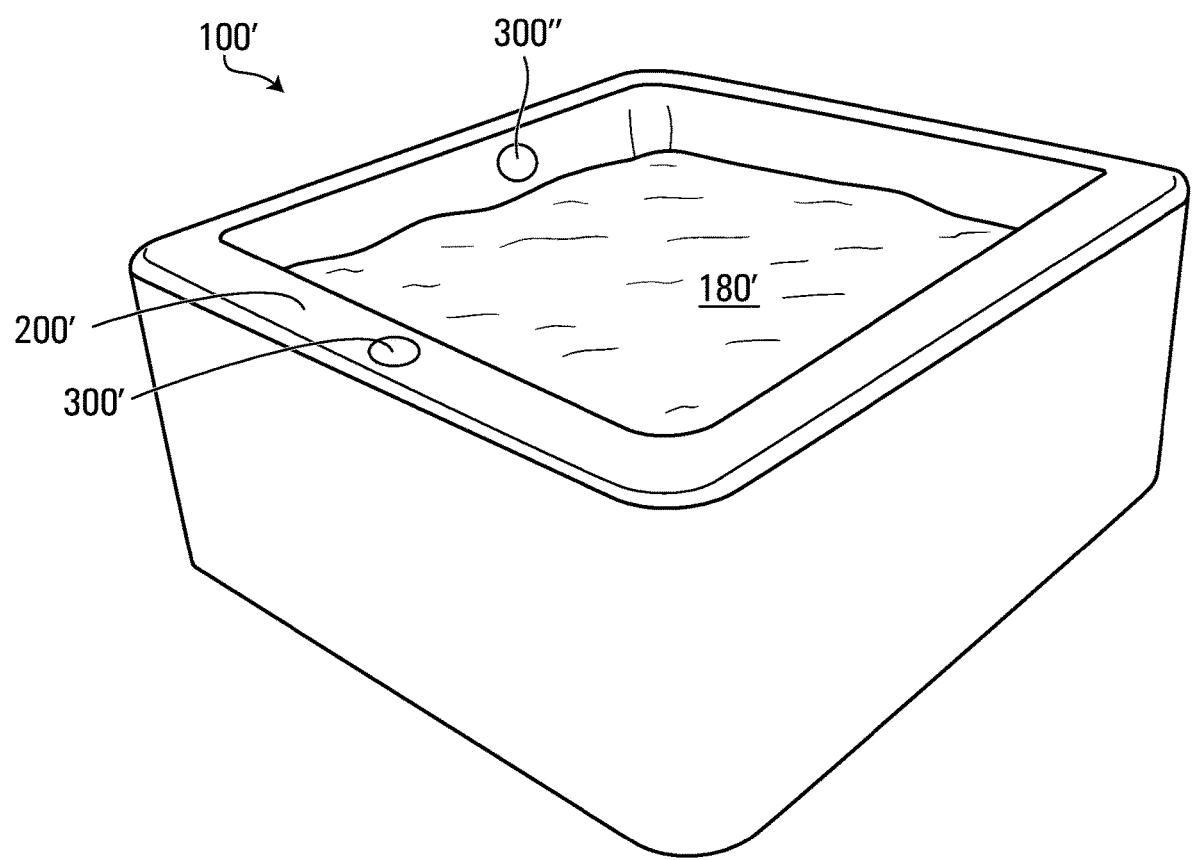
FIG. 13 shows a bathing unit on which a set of two topside control panels of the type depicted in FIG. 4 are installed on an upper portion of an inner surface and on a top surface of a peripheral wall in accordance with a specific practical example of implementation of the present invention.

A specific example of such an installation on a bathing unit system 100', analogous to bathing unit system 100 shown in FIG. 1, is depicted in FIG. 13 of the drawings.

As shown, the bathing unit system 100' includes a tub 180' (analogous to tub 180 shown in FIG. 1) for holding water, the tub having a peripheral wall 200' upon which a control panel 300', analogous to topside control panel 35, is positioned. While not shown, the bathing unit system 100' of FIG. 13 also includes a plurality of bathing unit components including at least one circulation pump. The bathing unit system 100' also includes a controller (not shown), of the type described with reference to controller 34 shown in FIG. 1, in communication with the control panel 300' for controlling operational settings associated with the bathing unit components in accordance with the principles described earlier in the present document.

In this exemplary practical implementation, the control panel 300' is a topside control panel and is positioned on an upper surface of peripheral wall 200' of the tub 180'.

In typical installations, the peripheral wall 200' of the tub 180' may be fabricated in part using a moldable and/or extrudable material, such as fiberglass, plastic or other materials, including metal and ceramic materials for example. In a practical implementation, the topside control panel 300' may be installed in a pre-made mount opening formed on the peripheral wall 200' or by drilling or otherwise forming such an opening in the bathing unit tub peripheral wall. The topside control panel 300' is then installed so that wiring is passed through the mount opening to that it can be suitably connected to the controller. The topside control panel may further be secured in place upon the peripheral wall 200' using any suitable mounting fasteners and/or adhesives and/or mounting gaskets.

While the control panel 300' has been shown as mounted to an upper surface of the peripheral wall 200' of the tub 180', it will however be apparent to the person skilled in the art that the control panel 300' may be mounted in other suitable locations on the tub 180', including for example along the spa skirt. In FIG. 13, a second control panel 300" is shown mounted on an upper portion of the inner peripheral wall 200'.

In some specific implementations, there are two or more topside control panels in the bathing unit system 180'. In the example depicted, this includes a first topside control panel 300' and a second topside control panel 300". The first topside control panel 300' and the second topside control panel 300" and each in communication with the bathing unit controller. In addition, the first topside control panel 300' and the second topside control panel 300" may be in communication with one another either directly and/or via the bathing unit controller. When the first and second topside control panels 300' 300" are in communication directly with another, the communication link may be a wirelines link or a wireless communication link so at to permit to the topside control panels to exchange signals therebetween. In some specific implementations, the one or more processors of the second topside control panel 300" may be programmed for dynamically adapting the multi-layer menu driven interface displayed on the display of the second topside control panel 300" in response to rotations and inward displacements of the manually operable actuator of the first topside control panel 300' to present information on the second topside control panel 300" conveying user selections made using the manually operable actuator of the first topside control panel 300'. The one or more processors of the first topside control panel 300" may be programmed likewise for dynamically adapting the multi-layer menu driven interface displayed on the display of the first topside control panel 300' in response to rotations and inward displacements of the manually operable actuator of the second topside control panel 300" to present information on the first topside control panel 300' conveying user selections made using the manually operable actuator of the second topside control panel 300".

In some embodiments, the first topside control panel 300' and the second topside control panel 300" are adapted to have different menu driven interfaces including different menu layers so that each interface enables the user to control different sets components of the bathing unit system 100' and/or allows the user to control the components of the bathing unit system 100' in a different way. For example, the first topside control panel 300' may be configured with a first multi-level menu driven interface including layers for controlling water temperature, the pumps, lighting elements and massage sequences while the second topside control panel 300' may be configured with a first multi-level menu driven interface including layers for controlling only the pumps and/or the massage sequences. As such, first topside control panel 300' may be configured to additional features relative to the second control panel 300" or vice versa. As another example, the first topside control panel 300' can be configured to display screen options including the menu layer 400 shown in in FIG. 11A while the second topside control panel 300" can be configured to display screen options including the menu layer 500 in FIG. 11B.

The person skill in the art will appreciated that many variations to the embodiments described in the present document art possible and will become apparent from a reading of the present document concurrently with the figures.

The non-limiting embodiment shown in the Figures only illustrates one specific practical example in which a person of skill may use the concept presented in the present document in order to provide a user with a topside control panel for controlling and/or monitoring component in a bathing unit system. Other practical implementations may be possible. For example, while the outer periphery of the topside control panel illustrated in the Figures is of generally circular shape, other shapes can also be contemplated in alternative implementations. For instance, it will become apparent to the person of skill that the control panel can have a manually operable control with a generally circular inner periphery, the outer periphery of the manually operable control may have another shape such as, but without being limited thereto, a generally square shape, a generally oval shape, a generally square shape, a generally triangular shape, and the like. Additionally or alternatively, the topside control panel may include decorative or informative overlay, optionally including ornamental layers or designs.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the invention have been described and illustrated, it will be apparent to those skilled in the art in light of the present description that numerous modifications and variations can be made. The scope of the invention is defined more particularly in the appended claims.

The invention claimed is:

1. A topside control panel for controlling water features in a bathing unit system, the bathing unit system including a tub holding water, a circulation system including an inlet and outlet in the tub and one or more pumps for circulating the water held in the tub through the circulation system between in the inlet and outlet, said topside control panel comprising:

a) a housing having a generally circular housing portion including a display screen;

b) a manually operable actuator positioned about a periphery of the generally circular housing portion and configured for triggering signals in response to displacements of the manually operable actuator by a user;

c) a circuit board assembly positioned in the housing and operatively coupled to the display screen and the manually operable actuator, said circuit board assembly including one or more processors programmed for:

i) rendering on the display screen a graphical user interface (GUI), the GUI presenting a multi-layer menu driven interface comprising multiple menu layers presenting user-selectable options for controlling at least some water features of the bathing unit system, wherein at least one specific menu layer of the multiple menu layers presents user-selectable options for controlling the one or more pumps; and ii) using signals triggered by a combination of the displacements of the manually operable actuator to navigate through different menu layers of the multiple menu layers and cause individual menu layers in the multiple menu layers to be sequentially presented on the GUI to arrive at the at least one specific menu layer presenting the user-selectable options for controlling the one or more pumps, the combination of the displacements including rotations of the manually operable actuator about the periphery of the generally circular housing portion and tactile inputs provided by the user through the manually operable actuator.

2. A topside control panel as defined in claim 1, wherein the manually operable actuator includes an inner periphery adjacent the periphery of the generally circular housing portion and an outer periphery, the outer periphery including gripping elements for facilitating manipulation of the manually operable actuator by the user.

3. A topside control panel as defined in claim 2, wherein the gripping elements include at least one of a plurality of indentations and a plurality of protrusions positioned about the outer periphery of the manually operable actuator.

4. A topside control panel as defined in claim 2, wherein the gripping elements include a plurality of interleaved indentations and protrusions positioned about the outer periphery of the manually operable actuator, the plurality of interleaved indentations and protrusions forming finger gripping element for engaging fingers of the user of the bathing unit system to facilitate rotating the manually operable actuator.

5. A topside control panel as defined in claim 1, wherein the manually operable actuator includes an inner periphery adjacent the periphery of the generally circular housing portion and an outer periphery, the outer periphery having a surface comprised of a gripping material for facilitating manipulation of the manually operable actuator by the user.

6. A topside control panel as defined in claim 1, wherein the manually operable actuator is a ring-shaped manually operable actuator encircling the periphery of the generally circular housing portion.

7. A topside control panel as defined in claim 6, wherein a first set of magnets is arranged about an inner periphery of the ring-shaped manually operable actuator.

8. A topside control panel as defined in claim 7, wherein a second set of magnets is arranged about an outer periphery of the generally circular housing portion, the second set of magnets having an opposite pole to the first set of magnets and, together with the first set of magnets, being configured for imparting a tactile effect to the ring-shaped manually operable actuator as the ring-shaped manually operable actuator is rotated about the generally circular housing portion.

9. A topside control panel as defined in claim 7, wherein the signals triggered by the combination of the displacements of the manually operable actuator are triggered at least in part by sensors positioned in the generally circular housing portion, the sensors being configured to generate signals conveying magnetic effects caused by the first set of magnets, wherein said one or more processors are programmed for processing the signals conveying the magnetic effects caused by the first set of magnets to derive information conveying a direction and an amount of rotation of the manually operable actuator.

10. A topside control panel as defined in claim 1, wherein the manually operable actuator is configured for disengaging the periphery of the generally circular housing portion in response to a pulling force applied to the manually operable actuator, the pulling force being oriented away from the housing.

11. A topside control panel as defined in claim 1, wherein the tactile inputs include inward displacements of the manually operable actuator between an extended position and an actuated position, the inward displacements being in a direction transverse to a direction of rotation of the manually operable actuator.

12. A topside control panel as defined in claim 11, wherein the one or more processors are programmed for permitting navigation through the multi-layer menu driven interface by using signals triggered at least in part by a combination of the rotations of the manually operable actuator and the inward displacements of the manually operable actuator to navigate through the different menu layers of the multiple menu layers to arrive at the at least one specific menu layer presenting the user-selectable options for controlling the one or more pumps.

13. A topside control panel as defined in claim 11, wherein the manually operable actuator is responsive to a force oriented towards the housing in the direction transverse to the direction of the rotation of the manually operable actuator for:

i) moving from the extended position towards the actuated position; and ii) reverting to the extended position absent the force.

14. A topside control panel as defined in claim 13, wherein the force is applied to at least one of the generally circular housing portion and the manually operable actuator.

15. A topside control panel as defined in claim 1, wherein the user-selectable options presented on the at least one specific menu layer are configured for permitting controlling the one or more pumps at least in part using the rotations of the manually operable actuator.

16. A topside control panel as defined in claim 15, wherein the user-selectable options presented on the at least one specific menu layer are configured for permitting controlling the one or more pumps using rotations of the manually operable actuator to modify a current speed of operation of at least one pump from the one or more pumps.

17. A topside control panel as defined in claim 11, wherein the user-selectable options presented on the at least one specific menu layer are configured for controlling the one or more pumps at least in part using the rotations of the manually operable actuator and the inward displacements of the manually operable actuator between the extended position and the actuated position, wherein the user-selectable options for controlling the one or more pumps are configured for:

a) permitting activating a specific pump amongst the one or more pumps in response to the inward displacements of the manually operable actuator between the extended position and the actuated position; and b) modifying a current speed of operation of the specific pump using the rotations of the manually operable actuator.

18. A topside control panel as defined in claim 11, wherein the user-selectable options presented on the at least one specific menu layer are configured for controlling the one or more pumps at least in part using the inward displacements of the manually operable actuator between the extended position and the actuated position, wherein the user-selectable options for controlling the one or more pumps are configured for:

a) permitting activating a specific pump amongst the one or more pumps in response to a first inward displacement of the manually operable actuator between the extended position and the actuated position; and b) modifying a current speed of operation of the specific pump in response to a second inward displacement of the manually operable actuator between the extended position and the actuated position, the manually operable actuator reverting to the extended position between the first inward displacement and the second inward displacement.

19. A topside control panel as defined in claim 11, wherein the user-selectable options presented on the at least one specific menu layer are configured for controlling the one or more pumps at least in part using the rotations of the manually operable actuator and the inward displacements of the manually operable actuator between the extended position and the actuated position, wherein the user-selectable options for controlling the one or more pumps are configured for:

a) permitting activating a group of pumps amongst the one or more pumps in response to the inward displacements of the manually operable actuator between the extended position and the actuated position, the group of pumps including at least two pumps; and b) modifying current speeds of operation of pumps in the group of pumps using the rotations of the manually operable actuator.

20. A topside control panel as defined in claim 19, wherein the pumps in the group of pumps operate are variable speed pumps.

21. A topside control panel as defined in claim 11, wherein the user-selectable options presented on the at least one specific menu layer are configured for controlling the one or more pumps at least in part using the inward displacements of the manually operable actuator between the extended position and the actuated position, wherein the user-selectable options for controlling the one or more pumps are configured for permitting activating a selected number of pumps amongst the one or more pumps in response to the inward displacements of the manually operable actuator between the extended position and the actuated position, the selected number of pumps corresponding to a number of the inward displacements of the manually operable actuator between the extended position and the actuated position, the manually operable actuator reverting to the extended position between consecutive inward displacements.

22. A topside control panel as defined in claim 11, wherein the user-selectable options presented on the at least one specific menu layer are configured for controlling the one or more pumps at least in part using the rotations of the manually operable actuator and the inward displacements of the manually operable actuator between the extended position and the actuated position, wherein the user-selectable options for controlling the one or more pumps include a set of pumping patterns available for selection, and wherein the one or more processors are programmed for:

a) permitting navigation between pumping patterns in the set of pumping patterns using the rotations of the manually operable actuator to select a specific pumping pattern;

b) activating the one or more pumps to implement the specific pumping pattern in response to an inward displacement of the manually operable actuator between the extended position and the actuated position.

23. A topside control panel as defined in claim 22, wherein the one or more processors are programmed for modifying at least one of a current intensity and a current frequency associated with the specific pumping pattern using the rotations of the manually operable actuator.

24. A topside control panel as defined in claim 1, wherein the one or more processors are programmed for dynamically adapting the multi-layer menu driven interface at least in part in response to the displacements of the manually operable actuator to present information conveying at least one of:

a) user selections made using the topside control panel;

b) a specific menu layer in the multi-layer menu driven interface; or c) operational status information associated with components of the bathing unit system.

25. A topside control panel as defined in claim 1, wherein the one or more processors are programmed for adapting the multi-layer menu driven interface rendered on the display screen at least in part based on criteria independent from the signals triggered in response to the combination of the displacements of the manually operable actuator, wherein adapting the multi-layer menu driven interface includes modifying the user-selectable options presented on the user interface.

26. A topside control panel as defined in claim 25, wherein the one or more processors are programmed for adapting the multi-layer menu driven interface based on current timing information, wherein the current timing information conveys at least one of:

a) current period of day;
b) current day of week;
c) current month; or
d) current season.

27. A topside control panel as defined in claim 25, wherein the one or more processors are programmed for adapting the multi-layer menu driven interface based on user identification information, wherein the adapting includes:

a) receiving a user identification signal conveying the user identification information associated with the user of the bathing unit system; and b) modifying the multi-layer menu driven interface to derive a custom multi-layer menu driven interface at least in part by processing the user identification information.

28. A bathing unit system comprising:
a) a tub for holding water;
b) a circulation system including an inlet and outlet in the tub;
c) a plurality of bathing unit components including one or more pumps for circulating the water held in the tub through the circulation system between the inlet and outlet;

d) a controller for controlling operational settings associated with the plurality of bathing unit components; and
e) one or more topside control panels as defined in claim 1, the one or more topside control panels being in communication with the controller for allowing a user of the bathing unit system to control and/or monitor operational settings of at least some of the plurality of bathing unit components in the bathing unit system.

29. A bathing unit system according to claim 28, wherein the tub for holding water includes an inner peripheral wall and wherein at least one of the one or more topside control panels is positioned on an upper portion of the inner peripheral wall so as to be operably accessible by a user located in the tub of the bathing unit system.

30. A bathing unit system according to claim 29, wherein the one or more topside control panels includes at least two topside control panels comprising a first topside control panel and a second topside control panel.

31. A bathing unit system as defined in claim 30, wherein the displacements of the manually operable actuator of the first topside control panel include:
 a) rotations of the manually operable actuator of the first topside control panel about a periphery of a generally circular housing portion of the first topside control panel; and
 b) inward displacements of the manually operable actuator of the first topside control panel between an extended position and an actuated position, the inward displacements of the manually operable actuator being in a direction transverse to a direction of rotation of the manually operable actuator.

* * * * *

UNITED STATES PATENT AND TRADEMARK OFFICE
CERTIFICATE OF CORRECTION

| | |
|---|---|
| PATENT NO. | : 12,086,334 B2 |
| APPLICATION NO. | : 17/515703 |
| DATED | : September 10, 2024 |
| INVENTOR(S) | : Kathryn Thibeault et al. |

It is certified that error appears in the above-identified patent and that said Letters Patent is hereby corrected as shown below:

In the Claims

Column 39, In Claim 30, Line 19, add the sentence "wherein the one or more processors of the second topside control panel are programmed for dynamically adapting the multi-layer menu driven interface displayed on the display of the second topside control panel at least in part in response to displacements of the manually operable actuator of the first topside control panel to present information on the second topside control panel conveying user selections made using the displacements of the manually operable actuator of the first topside control panel."

Signed and Sealed this
Tenth Day of December, 2024

Katherine Kelly Vidal
*Director of the United States Patent and Trademark Office*